(12) United States Patent
Wang

(10) Patent No.: US 8,442,361 B1
(45) Date of Patent: May 14, 2013

(54) APPARATUS AND METHOD OF LINEARIZATION IN AN OPTICAL MODULATOR

(75) Inventor: Leah Wang, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 238 days.

(21) Appl. No.: 12/620,526

(22) Filed: Nov. 17, 2009

Related U.S. Application Data

(60) Provisional application No. 61/116,285, filed on Nov. 19, 2008.

(51) Int. Cl.
*G02F 1/295* (2006.01)

(52) U.S. Cl.
USPC .................................................. 385/8; 385/2

(58) Field of Classification Search ........................ 385/8
See application file for complete search history.

(56) References Cited

U.S. PATENT DOCUMENTS

| | | | | |
|---|---|---|---|---|
| 5,408,544 A * | 4/1995 | Seino | | 385/3 |
| 5,526,448 A * | 6/1996 | Nagata et al. | | 385/1 |
| 5,963,352 A * | 10/1999 | Atlas et al. | | 398/193 |
| 5,991,471 A * | 11/1999 | Yu | | 385/3 |
| 6,091,864 A * | 7/2000 | Hofmeister | | 385/2 |
| 6,239,897 B1 | 5/2001 | Jackson | | |
| 6,526,186 B2 * | 2/2003 | Burns | | 385/2 |
| 6,552,838 B2 | 4/2003 | Ransijn et al. | | |
| 6,760,493 B2 * | 7/2004 | Pruneri et al. | | 385/8 |
| 7,321,702 B2 * | 1/2008 | Akiyama et al. | | 385/3 |
| 7,460,739 B2 * | 12/2008 | Gilardi et al. | | 385/8 |
| 7,570,888 B2 | 8/2009 | Pappert et al. | | |
| 7,809,216 B2 * | 10/2010 | Cox, III | | 385/2 |
| 7,869,668 B2 * | 1/2011 | Hashimoto et al. | | 385/3 |
| 7,916,981 B2 * | 3/2011 | Kawano et al. | | 385/1 |
| 2005/0220385 A1 * | 10/2005 | Kawanishi et al. | | 385/1 |
| 2007/0165977 A1 * | 7/2007 | Cole et al. | | 385/8 |
| 2009/0003840 A1 | 1/2009 | Nahapetian et al. | | |
| 2009/0232518 A1 * | 9/2009 | Caton et al. | | 398/193 |

OTHER PUBLICATIONS

"Application Note Modulator Bias Controllers," (2004) pp. 1-14, PHOTONICSystems, Inc., Billerica, MA.

Betts, "Linearized Modulator for Suboctave-Bandpass Optical Analog Links," IEEE Transactions on Microwave Theory and Techniques, Dec. 1994, pp. 2642-2649, vol. 42, No. 12, IEEE.

Cummings, Uri, "Linearized and High Frequency Electrooptic Modulators," Thesis, California Institute of Technology, 2005.

Dubovitsky, S. et al., "Analysis and Improvement of Mach-Zehnder Modulator Linearity Performance for Chirped and Tunable Optical Carriers," Journal of Lightwave Technology, vol. 20, No. 5, May 2002.

* cited by examiner

*Primary Examiner* — Charlie Peng
(74) *Attorney, Agent, or Firm* — McDermott Will & Emery LLP

(57) ABSTRACT

An optical modulator apparatus and linearization method are disclosed. The optical modulator may include a buffer layer disposed proximate the electro-optical material substrate. The optical modulator may also include physically asymmetric waveguide elements, which may have physically asymmetric waveguide arms or physically asymmetric hot electrodes. The waveguide arms may include first and second waveguide arms having different dimensions, and the hot electrodes may include first and second hot electrodes having different dimensions. Modulator linearization may be achieved by the above-described modulator structure. Modulator linearization may also be achieved by asymmetric external driving of electric fields applied to the waveguide elements, where the waveguide or electrode dimensions may or may not be symmetric.

13 Claims, 14 Drawing Sheets

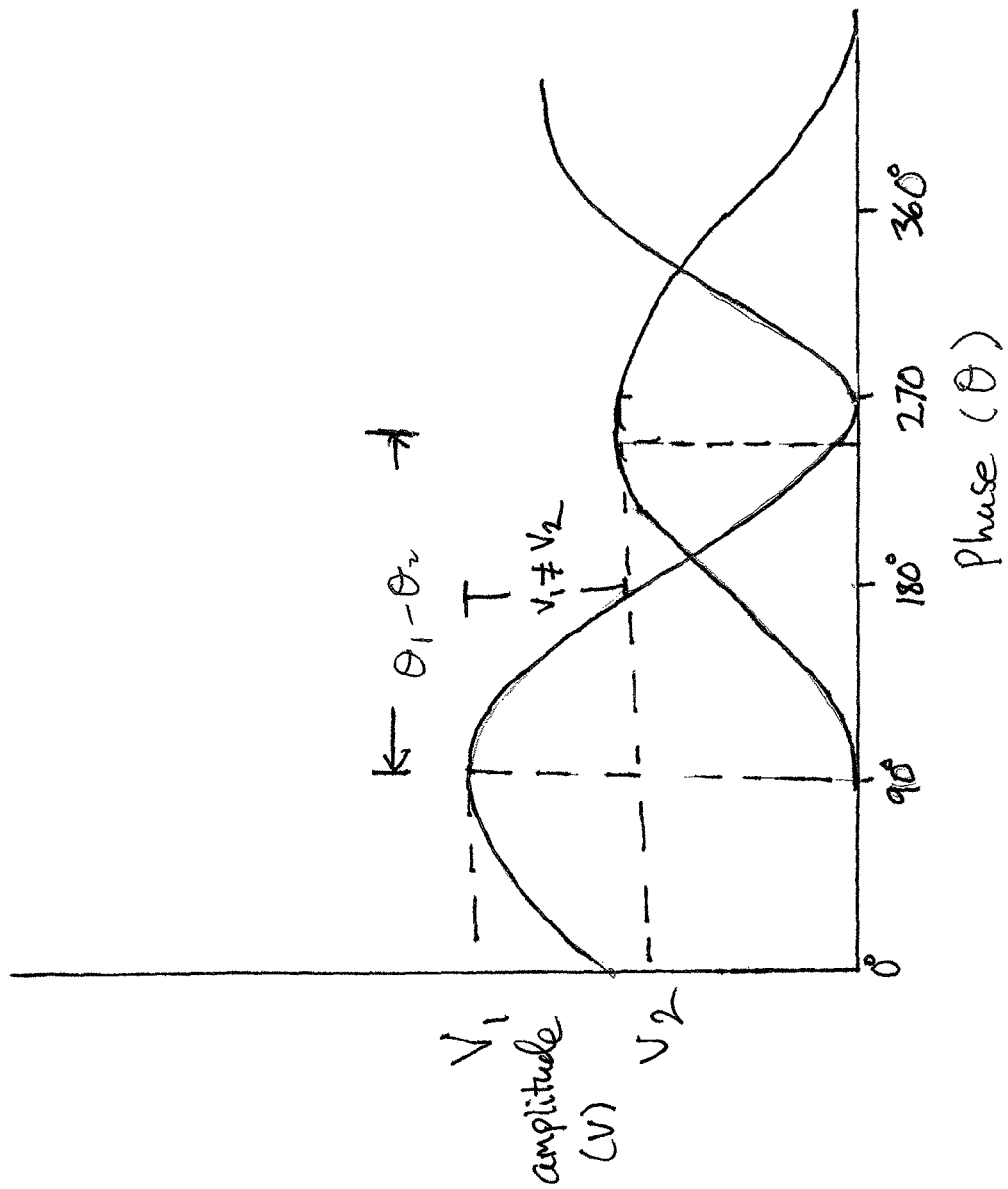

APPARATUS AND METHOD OF LINEARIZATION IN AN OPTICAL MODULATOR

CROSS-REFERENCES TO RELATED APPLICATIONS

The present application claims the benefit of priority under 35 U.S.C. §119 from U.S. Provisional Patent Application Ser. No. 61/116,285, entitled "LITHIUM NIOBATE MODULATORS WITH LARGE SPUR-FREE DYNAMIC RANGE ANALOG FIBER OPTIC LINKS," filed on Nov. 19, 2008, which is hereby incorporated by reference in its entirety for all purposes.

STATEMENT REGARDING FEDERALLY SPONSORED RESEARCH OR DEVELOPMENT

Not applicable.

FIELD

The subject technology relates in general to optical modulators, and more particularly to, an apparatus and method of linearization in an optical modulator.

BACKGROUND

Optical modulators may operate according to a transfer function that yields a significant distortion product. For example, in some analog applications, the sinusoidal transfer function of a typical optical modulator may be limited with respect to achieving a suitable spur-free dynamic range and intermodulation third (3rd) order intercept. In one consequence, the 3rd order distortion may be detected within an undesirable proximity to actual signals. Thus, suppressing 3rd order distortion may be of significant utility for an optical modulator.

SUMMARY

In one aspect of the disclosure, an optical modulator may comprise an electro-optical material substrate. The optical modulator may include a buffer layer disposed proximate the electro-optical material substrate. The optical modulator may also include physically asymmetric waveguide elements disposed proximate the buffer layer configured to affect modulation of an optical signal propagating through the optical modulator. A group of the physically asymmetric waveguide elements may include physically asymmetric waveguide arms or physically asymmetric hot electrodes. The physically asymmetric waveguide arms may comprise a first waveguide arm and a second waveguide arm, and a dimension of a first type for the first waveguide arm is different from a dimension of the first type for the second waveguide arm. The physically asymmetric hot electrodes may comprise a first hot electrode and a second hot electrode, and a dimension of a second type for the first hot electrode is different from a dimension of the second type for the second hot electrode.

In a further aspect of the disclosure, an optical modulation apparatus may comprise an optical modulator. The optical modulator may include first and second waveguide arms. The first and second waveguide arms may be disposed to receive an optical input signal. The optical modulator may further include first and second hot electrodes. Each of the first and second hot electrodes may be disposed proximate a respective one of the first and second waveguide arms. The optical modulator may be configured to modulate the optical input signals. The optical modulation apparatus may also include a radio frequency (RF) signal adjuster coupled to the first and second hot electrodes. The RF signal adjuster may be configured to provide first and second RF drive signals to the first and second hot electrodes respectively to produce first and second electric fields respectively. the first and second RF drive signals may be asymmetric. The first and second electric fields may be asymmetric.

In yet a further aspect of the disclosure, a method of modulating an optical signal may comprise receiving the optical signal in an optical modulator. The method may include splitting the optical signal into a first and second light beam. The method may include receiving the first light beam through a first waveguide arm in the optical modulator. The method may include receiving the second light beam through a second waveguide arm in the optical modulator. The method may include applying a first radio frequency (RF) drive signal to a first hot electrode disposed proximate the first waveguide arm. The method may include applying a second RF drive signal to a second hot electrode disposed proximate the second waveguide arm. The method may include generating a first electric field proximate the first waveguide arm wherein the first electric field has a first amplitude and a first phase. The method may also include generating a second electric field proximate the second waveguide arm wherein the second electric field has a second amplitude and a second phase, wherein the first and second waveguide arms may be physically asymmetric, the first and second hot electrodes maybe physically asymmetric, or the first and second RF drive signals may be asymmetric It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1A:
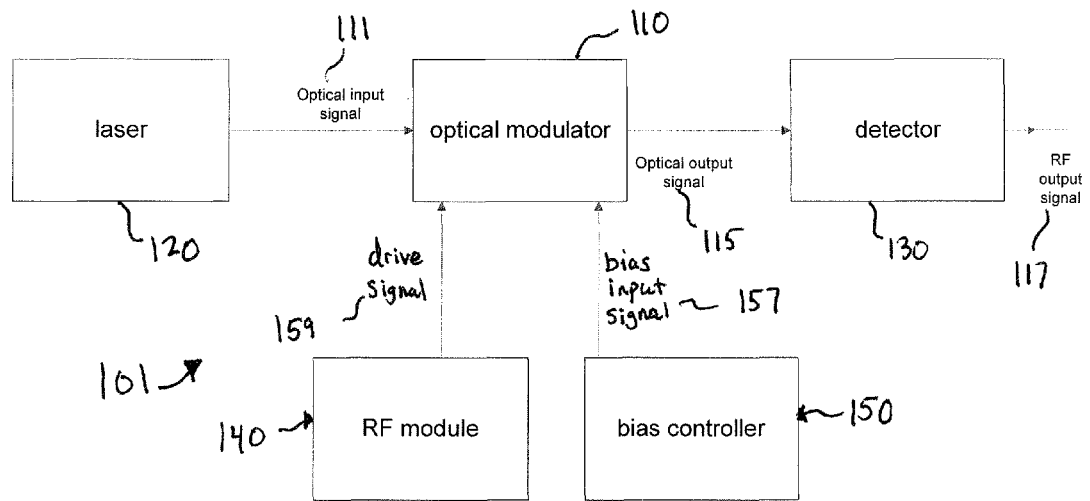
FIG. 1A is a conceptual block diagram illustrating an example of an optical modulation apparatus.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Similar components are labeled with identical element numbers for ease of understanding, but components with identical element numbers may have the same or different configurations and provide the same or different functions.

By way of illustration and not limitation, aspects of the subject disclosure describe optical modulation systems and methods that may produce a desired chirp effect in modulated signals. In one aspect, an optical modulator may produce increased chirp. Increased chirp may provide increased linearization in a transfer function of an optical modulator. Increased chirp may be beneficial in analog applications and, in one aspect, the systems and methods of the subject disclosure may include an analog configuration.

One approach to linearization may include the use of a linear optical phase modulator in conjunction with an optical phase linear detector. Using a linear optical phase modulator in conjunction with an optical phase linear detector may be, however, limited to a sub-GHz bandwidth due to the optical phase lock loop response time of the linear receiver. It may be difficult to increase bandwidth even with highly integrated devices.

Another approach may employ Mach-Zehnder modulators (MZM) or Y-coupler superstructures with an optical or electrical delay to cancel out third (3rd) intermod distortion (IMD) signals. This approach may, however, suffer from tight tolerances and smaller dynamic ranges. Difficulty in fabricating superstructures may also contribute to difficulties in this approach.

Another approach may use high extinction ratio electro-absorptive modulators (EAMs). The EAM based techniques, however, may be limited by low power handling capability, large insertion losses, and limited extinction ratio.

Chirp may be measured in terms of frequency (Hz). A modulated signal may be considered "chirped" when the output frequency increases or decreases with time. Optical modulators may be configured with a built-in chirp parameter (a), a coefficient rating of intrinsic chirp, measured in arbitrary units (A.U.) Typical optical modulators may include a built-in chirp parameter of approximately 0.7 A.U. In accordance with one aspect, embodiments of the subject technology may be configured to produce an increase in chirp in the modulation of an optical signal. Optical modulators may be configured with a built-in chirp parameter in the range of 2-3 A.U. according to one aspect of the subject technology, although optical modulators with a chirp parameter of greater than 3 A.U. may be feasible according to another aspect of the subject technology. A built-in chirp parameter may be sometimes referred to as a chirp parameter or a device chirp parameter, and vice versa.

Increased chirping may induce linearization in a transfer function of an optical modulator. Aspects of the subject technology may generally be considered as employing, for example, one of a plurality of approaches of inducing chirp in an optical modulator. One approach may employ built-in waveguide asymmetry in an optical modulator. Another approach may employ external drive asymmetry on a dual drive modulator. Yet another approach may combine the aforementioned approaches.

Referring now to the figures, FIG. 1A shows an example of an optical modulation apparatus 101 which in general, may comprise a laser 120, an optical modulator 110, and a detector 130. An optical input signal 111 transmitted from the laser 120 into the optical modulator 110 may be modulated according to a drive signal 159 transmitted from an RF module 140 and a bias input signal 157 transmitted from a bias controller 150. In one exemplary embodiment, the optical modulator 110 may be a Mach-Zehnder modulator. In one aspect, the optical modulator may be a lithium niobate (LN) modulator. Linearization of an LN Mach-Zehnder modulator may be significant in achieving higher SFDR and intermod distortion 3rd order intercept (IMD OIP3) in analog fiber optics links. A typical optical modulator may be limited in SFDR and OIP3 due to its sinusoidal transfer function which may yield a strong 3rd order distortion product. OIP3 may be significant in analog transmissions because the 3rd order distortion IMD signal can lie very close to the actual signals and may thus be considered to be in band. To increase SFDR and the OIP3 range of an optical modulator, linearization of the optical modulator transfer function can be controlled such that 3rd order distortion can be suppressed. The term "3rd order distortion intercept" may be sometimes referred to as "OIP3" and vice versa.

Figure 1D:
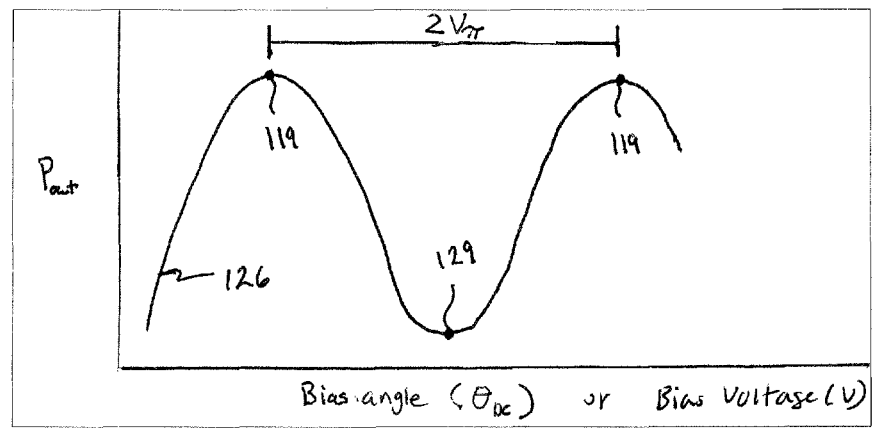
FIG. 1D is a graph illustrating an example of a transfer function of an optical modulator.
Figure 1B:
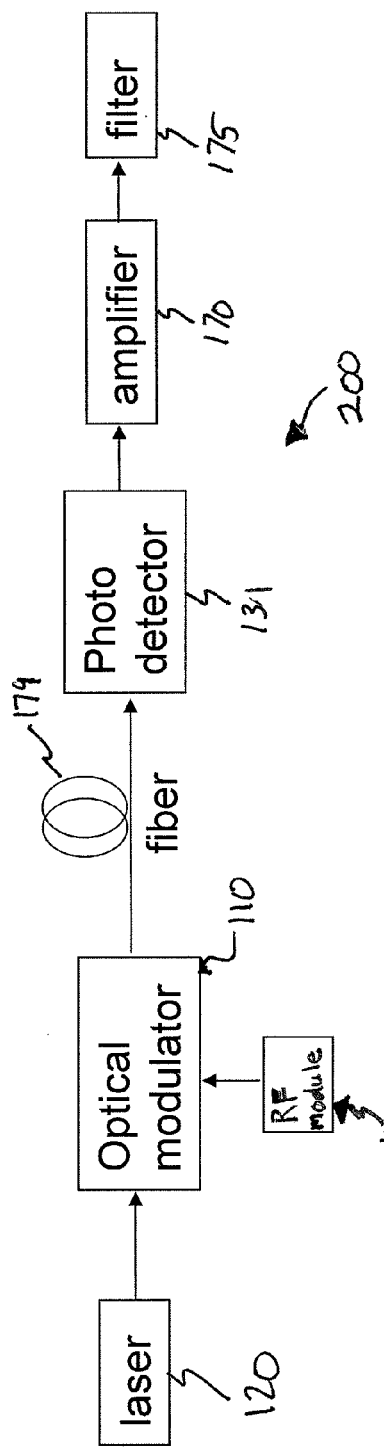
FIG. 1B is a conceptual block diagram illustrating an example of an analog system.

Referring to FIG. 1B, an exemplary configuration of an analog system 200 employing an optical modulator 110 configured for increased linearity in its transfer function according to an aspect of the subject technology is shown. The analog system 200 may include a laser 120, an optical modulator 110, an RF module 140, a fiber 179, a photo detector 131, an amplifier 170, and a filter 175. The laser 120 may transmit an optical signal into the optical modulator 110. In this exemplary configuration, the analog system 200 may be configured to receive analog RF signals from the RF module 140 for modulation in the optical modulator 110. In one aspect, the analog system 200 may be an analog fiber optics link system. The fiber 179 may be an optical fiber coupled between the optical modulator 110 and the photo detector 131. Analog RF signals may be provided from analog sources, for example, such as an antenna, a receiver, or a port of a signal generator/transmitter. The amplifier 170 may be a low-noise amplifier amplifying signals provided by the photodetector 131. The photodetector 131 may be a linear photodetector. The filter 175 may be a narrow bandpass filter configured to eliminate noise from amplified signals.

Figure 1C:
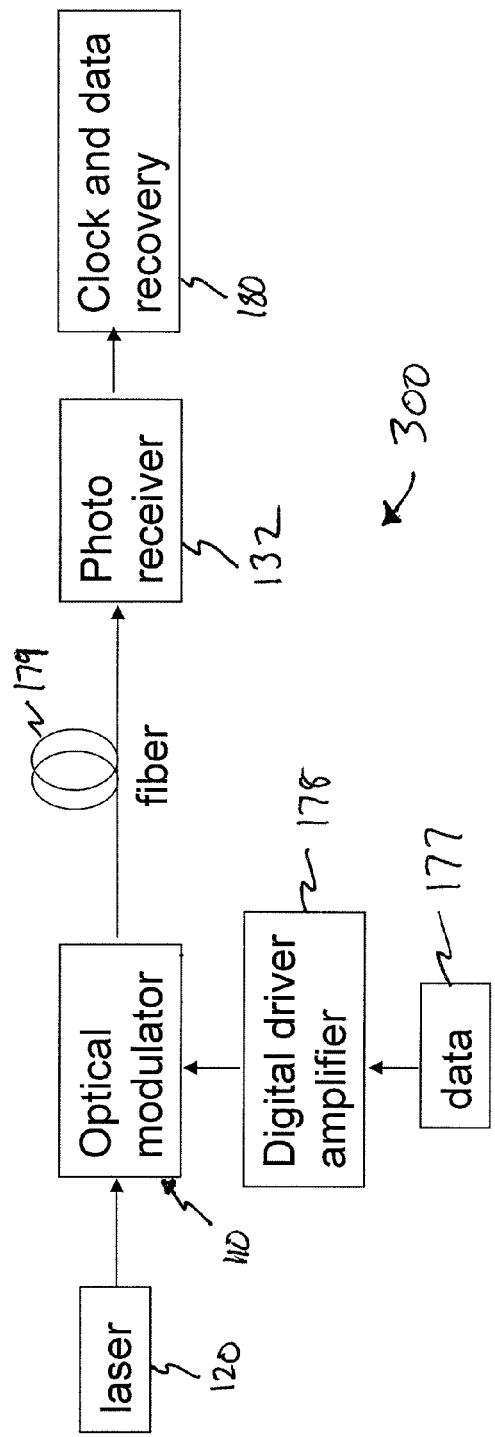
FIG. 1C is a conceptual block diagram illustrating an example of a digital system.

Referring to FIG. 1C, an exemplary configuration of a digital system 300 employing an optical modulator 110 configured for increased linearity in its transfer function according to an aspect of the subject technology is shown. The digital system 300 may include a laser 120, an optical modulator 110, a digital driver amplifier 178, a fiber 179, a photo receiver 132, and a clock and data recovery module 180. Data 177 may be digital data received by the digital driver amplifier 178 for modulating an optical signal received by the optical modulator 110 from the laser 120. The fiber 179 may be an optical fiber coupled between the optical modulator 110 and the photo receiver 132. In one aspect, the photo receiver 132 may be a limiting amplifier based receiver that includes a photo detector (not shown). The clock-data recovery module 180 may recover clock signals and data.

A transfer function of an optical modulator may be linearized by increasing chirp under exemplary embodiments of the subject technology. Chirp may modify the transfer function through the interplay between phase modulation and intensity modulation. According to aspects of the subject disclosure, with large enough chirp, the transfer function may approach that of an EAM except for retaining the periodicity of an optical modulator. In some aspects, chirped modulators may find limited applications in digital communication links due to chirp's impairment in the presence of dispersion. In other aspects, however, chirp may not pose limitations for analog links over short distances according to exemplary embodiments described herein. Thus, chirp can be exploited in optical modulator technology to linearize the transfer function and enhance analog performance. In accordance with general aspects of the disclosure, there may be at least three exemplary methods to induce chirp and linearize the transfer function in an optical modulator. One exemplary method may use built-in waveguide asymmetry (e.g., by altering waveguide device geometry) which in turn may translate to electric field asymmetry. Another exemplary method may employ asymmetric direct external driving to produce asymmetric electric fields in a symmetric dual drive optical modulator. A third exemplary method may be a combination of the two methods. Asymmetry in electric fields may be produced by generating asymmetry in the phases and amplitudes of the electric fields.

FIG. 1D illustrates an exemplary transfer function of an optical modulator. With concurrent reference to FIGS. 1A and 1D, the vertical axis of the transfer function curve 126 may represent absolute or relative output power of an optical modulator. In one example, the vertical axis may represent an optical output signal 115. The horizontal axis of the transfer function curve 126 may represent a DC bias voltage applied to an optical modulator (e.g., a DC bias voltage applied by a bias controller 150 to a modulator 110). The term "DC bias voltage" or "bias voltage" may be sometimes referred to as DC bias phase, DC phase bias, bias phase, DC bias, DC bias angle, DC phase bias angle, DC bias phase angle, phase angle or vice versa. In the exemplary depiction shown, the transfer function curve 126 depicts $2V_\pi$, and $V_\pi$ (sometimes referred to as $V_{pi}$), may be a bias voltage difference between a peak 119 and a null 129 of a transfer function curve 126. A position of the transfer function curve 126 may be controlled by a DC bias voltage via the bias input signal 157.

An output electric field, sometimes referred to as an E field, of an optical modulator can be written as:

$$\vec{E}_{tot} = \vec{E}_1 + \vec{E}_2$$
$$= E_1\left[\cos\left(\omega_{opt}t + \frac{\pi V_1}{V_\pi}\sin(\omega_{RF}t + \theta_1) + \phi_1 + \theta_{DC}\right) + \right.$$
$$\left. i\sin\left(\omega_{opt}t + \frac{\pi V_1}{V_\pi}\sin(\omega_{RF}t + \theta_1) + \phi_1 + \theta_{DC}\right)\right] +$$
$$E_2\left[\cos\left(\omega_{opt}t + \frac{\pi V_2}{V_\pi}\sin(\omega_{RF}t + \theta_2) + \phi_2\right) + \right.$$
$$\left. i\sin\left(\omega_{opt}t + \frac{\pi V_2}{V_\pi}\sin(\omega_{RF}t + \theta_2) + \phi_2\right)\right]$$

where $E_1$ and $E_2$ may correspond to the propagating fields at two waveguides in a dual armed optical modulator. $V_1$ and $V_2$ may be the applied voltages at each waveguide. $V_1$ may represent the amplitude of an RF signal applied to a first one of the waveguides, and $V_2$ may represent the amplitude of an RF signal applied to a second one of the waveguides. $\omega_{opt}$ and $\omega_{RF}$ may be the optical and RF angular frequencies, respectively. $\phi_1$ and $\phi_2$ may correspond to the phase asymmetries between the waveguides. $\theta_1$ and $\theta_2$ may be phase responses (e.g., AC phase responses) of the optical modulator. The phase responses may be dependent on the voltage inputs for each arm in a dual waveguide modulator. For example, $\theta_1$ may be the phase response of the output signal generated from a first waveguide arm based on a first voltage input on the first arm. $\theta_2$ may be a phase response of the output signal generated from a second waveguide arm based on a second voltage input on the second arm. $\theta_{DC}$ may be a DC bias angle for the optical modulator. In one example, $\omega_{opt}$ may be on the order of 193 terahertz while $\omega_{RF}$ may be on the order of megahertz to gigahertz.

Based on the output E field, the output optical intensity ($E_{tot}^2$) can be written as:

$$E_{tot}^2 = E_{tot} \cdot E_{tot}^\times = \left(E_1\cos\left(\omega_{opt}t + \frac{\pi V_1}{V_\pi}\sin(\omega_{RF}t + \theta_1) + \theta_{DC} + \phi_1\right) + \right.$$
$$\left. E_2\cos\left(\omega_{opt}t + \frac{\pi V_2}{V_\pi}\sin(\omega_{RF}t + \theta_2) + \phi_2\right)\right)^2 +$$
$$\left(E_1\sin\left(\omega_{opt}t + \frac{\pi V_1}{V_\pi}\sin(\omega_{RF}t + \theta_1) + \theta_{DC} + \phi_1\right) + \right.$$
$$\left. E_2\sin\left(\omega_{opt}t + \frac{\pi V_2}{V_\pi}\sin(\omega_{RF}t + \theta_2) + \phi_2\right)\right)^2 =$$
$$E_1^2 + E_2^2 + 2E_1E_2\left(\cos\left(\omega_{opt}t + \right.\right.$$
$$\frac{\pi V_1}{V_\pi}\sin(\omega_{RF}t + \theta_1) + \theta_{DC} + \phi_1\right)\cos\left(\omega_{opt}t + \right.$$
$$\frac{\pi V_2}{V_\pi}\sin(\omega_{RF}t + \theta_2) + \phi_2\right) + \sin\left(\omega_{opt}t + \right.$$
$$\frac{\pi V_1}{V_\pi}\sin(\omega_{RF}t + \theta_1) + \theta_{DC} + \phi_1\right)\sin\left(\omega_{opt}t + \right.$$

$$\frac{\pi V_2}{V_\pi}\sin(\omega_{RF}t+\theta_2)+\phi_2\Big)\Big)=E_1^2+E_2^2+$$

$$2E_1E_2\cos\Big(\Big(\omega_{opt}t+\frac{\pi V_1}{V_\pi}\sin(\omega_{RF}t+\theta_1)+\theta_{DC}+\phi_1\Big)-$$

$$\Big(\omega_{opt}t+\frac{\pi V_2}{V_\pi}\sin(\omega_{RF}t+\theta_2)+\phi_2\Big)\Big)=$$

$$E_1^2+E_2^2+2E_1E_2\cos\Big(\frac{\pi V_1}{V_\pi}\sin(\omega_{RF}t+\theta_1)-$$

$$\frac{\pi V_2}{V_\pi}\sin(\omega_{RF}t+\theta_2)+\theta_{DC}+(\phi_1-\phi_2)\Big).$$

$\Delta\phi=\phi_1-\phi_2$ may represent an optical modulator's chirp induced by intrinsic asymmetry. In one aspect, when the optical modulator's two arm optical power split ratio is 1:1 at the input ($P_{in}$) and output ($P_{out}$), then $$E_1=E_2=\sqrt{\frac{P_{in}}{2}}\quad P_{out}=\frac{1}{2}E_{tot}^2.$$

An optical modulator's optical output intensity can then be written as:

$$P_{out}=\frac{1}{2}\Big\{E_1^2+E_2^2+2E_1E_2\cos\Big(\frac{\pi V_1}{V_\pi}\sin(\omega_{RF}t+\theta_{DC}+\theta_1)-$$

$$\frac{\pi V_2}{V_\pi}\sin(\omega_{RF}t+\theta_2)+(\phi_1-\phi_2)\Big)\Big\}$$

$$=\frac{1}{2}\Big\{P_{in}+P_{in}\cos\Big(\frac{\pi V_1}{V_\pi}\sin(\omega_{RF}t+\theta_1)-$$

$$\frac{\pi V_2}{V_\pi}\sin(\omega_{RF}t+\theta_2)+\theta_{DC}+\Delta\phi\Big)\Big\}$$

$$=\frac{P_{in}}{2}\Big(1+\cos\Big(\frac{\pi V_1}{V_\pi}\sin(\omega_{RF}t+\theta_1)-\frac{\pi V_2}{V_\pi}\sin(\omega_{RF}t+\theta_2)+\theta_{DC}+\Delta\phi\Big)\Big).$$

Since built-in chirp may be intensity dependent, it can be written as:

$$\Delta\phi=\alpha(\omega)\Delta P_{out}$$

$$P_{out}=\frac{P_{in}}{2}\Big(1+$$

$$\cos\Big(\theta_{DC}+\frac{\pi V_1}{V_\pi}\sin(\omega_{RF}t+\theta_1)-\frac{\pi V_2}{V_\pi}\sin(\omega_{RF}t+\theta_2)+\alpha(\omega)\frac{d}{dt}P_{out}\Big)\Big)$$

where $\alpha$ may be frequency dependent and may represent a built-in chirp parameter, which may be measured in an arbitrary unit (A.U.) $\Delta P_{out}$ may represent an $\alpha$ power variance at different frequencies.

This equation can be solved via a numerical consistency method. Let $$P_{out}=f_0+f_1\sin(\omega_{RF}t)+f_1'\cos(\omega_{RF}t)+$$

$$f_2\cos(2\omega_{RF}t)+f_2'\sin(2\omega_{RF}t)+f_3\sin(3\omega_{RF}t)+\ldots$$

$$a=\frac{\pi(V_1+V_2)}{V_\pi}$$

$$b=\frac{\pi(V_1-V_2)}{V_\pi},\text{ and}$$

$$\phi_0=(\theta_1-\theta_2)/2.$$

Substituted into the differential equation and compared with similar terms, may result in, $$f_1\approx\sin\theta_{DC}(1+\sin^2(\phi_0))\sin^2(\phi_0+b/2)\Big(a-\frac{a^3}{8}\Big)(1+\alpha^2/8)$$

$$f_2\approx\cos\theta_{DC}(1+\sin^4(\phi_0))\sin^4(\phi_0+b/4)\Big(a^2/4+\frac{a^4}{48}\Big)(1+\alpha^2/4-\alpha^4/24)$$

$$f_3\approx\sin\theta_{DC}(1+\sin^6(\phi_0))\sin^6(\phi_0+b/6)\Big(\frac{a^3}{24}\Big)(1+\alpha^2/12)^{-4}\ldots$$

The optical output intensity from an optical modulator can then be written as:

$$P_{out}\approx\frac{P_{in}}{2}\Big\{1+$$

$$\Big[\sin\theta_{DC}(1+\sin^2(\phi_0))\sin^2(\phi_0+b/2)\Big(a-\frac{a^3}{8}\Big)(1+\alpha^2/8)\Big]\sin(\omega_{RF}t)+$$

$$\Big[\cos\theta_{DC}(1+\sin^4(\phi))\sin^4(\phi_0+b/4)\Big(a^2/4+\frac{a^4}{48}\Big)(1+\alpha^2/4-$$

$$\alpha^4/24)\Big]\cos(2\omega_{RF}t)+\Big[\sin\theta_{DC}(1+\sin^6(\phi_0))\sin^6(\phi_0+$$

$$b/6)\Big(\frac{a^3}{24}\Big)(1+\alpha^2/12)^{-4}\Big]\sin(3\omega_{RF}t)+\ldots$$

From the above equation, it can be seen that both intrinsic waveguide geometry built-in chirp as well as external drive configurations (which induces chirp) can contribute to an optical modulator's output intensity function. It will be understood that although a single RF frequency input was used in the above derivations for sake of illustration, the same conclusion may also apply to using multiple RF frequency input scenarios where 3rd order intermodulation products are not limited to 3rd order harmonic signals. In the following, various case scenarios are described.

Case I: Dual Arm Drive Modulator: Physical Symmetry; Symmetric RF Drive Amplitude ($\alpha=0$, $V_1=V_2$, $b=0$, $\theta_1-\theta_2=\pi$)

In one aspect, $\alpha$ may represent a built-in chirp parameter, $V_1$ may represent the amplitude of an RF signal applied to a first one of the waveguides, $V_2$ may represent the amplitude of an RF signal applied to a second one of the waveguides, and $$b=\frac{\pi(V_1-V_2)}{V_\pi}.$$

$\theta_1-\theta_2$ may be the difference between the phase of the RF signal applied to the first waveguide and the phase of the RF signal applied to the second waveguide. An RF signal may be sometimes referred to as an RF drive signal.

For Case I, in one aspect of the disclosure, an optical modulator has no built-in chirp, and the optical modulator may be under differential drive, with equal amplitude. For this case, an optical modulator's output intensity function may be described according to the following equation:

$$P_{out} = \frac{P_{in}}{2}\left(1 + \cos\left(\theta_{DC} + \frac{\pi V_1}{V_\pi}\sin(\omega_{RF}t + \theta_1) - \frac{\pi V_2}{V_\pi}\sin(\omega_{RF}t + \theta_1 + \pi)\right)\right)$$

$$= \frac{P_{in}}{2}\left(1 + \cos\left(\theta_{DC} + \frac{\pi(V_1 + V_2)}{V_\pi}\sin(\omega_{RF}t + \theta_1)\right)\right)$$

$$= \frac{P_{in}}{2}\left(1 + \sin\theta_{DC}\left(a - \frac{a^3}{8}\right)\sin(\omega_{RF}t + \theta_1) + \cos\theta_{DC}\left(\frac{a^2}{4} + \frac{a^4}{48}\right)\cos(2\omega_{RF}t + \theta_1) + \sin\theta_{DC}\left(\frac{a^3}{24}\right)\sin(3\omega_{RF}t + \theta_1) + \ldots\right).$$

The output intensity (e.g., output power intensity) in this case may be reduced to a standard transfer function for a dual-drive modulator. An optical modulator's transfer function may generally be of a sinusoidal nature associated with strong 3rd order distortion. The ratio of the 3rd order distortion term to fundamental may be given by $$\left(\frac{a^3}{24}\right)\bigg/\left(a - \frac{a^3}{8}\right).$$

This ratio may be affected by built-in device chirp, and this is described further below.

Case II: Dual Arm Drive Modulator: Physical Asymmetry; Symmetric RF Drive Amplitude ($\alpha \neq 0$, $V_1 = V_2$, $b = 0$, $\theta_1 - \theta_2 = \pi$)

In one aspect, a may represent a built-in chirp parameter, $V_1$ may represent the amplitude of an RF signal applied to a first one of the waveguides, $V_2$ may represent the amplitude of an RF signal applied to a second one of the waveguides, and $$b = \frac{\pi(V_1 - V_2)}{V_\pi}.$$

$\theta_1 - \theta_2$ may be the difference between the phase of the RF signal applied to the first waveguide and the phase of the RF signal applied to the second waveguide. An RF signal may be sometimes referred to as an RF drive signal.

For Case II, in one aspect of the disclosure, an optical modulator may have built-in chirps, and the optical modulator may be under differential drive with equal amplitude. In one aspect, a transfer function of an optical modulator may become more linear at larger chirp values. The waveguide elements in an optical modulator may be configured to produce certain chirp values and may affect modulation of an optical signal propagating through the optical modulator. In one example, large chirp may be induced in an optical modulator by having physical asymmetry among waveguide elements in the optical modulator. In one aspect, chirp due to waveguide asymmetry can affect the output intensity, and the output intensity may be expressed as follows:

$$P_{out} = \frac{P_{in}}{2}(1 + \cos(\theta_{DC} + \frac{\pi V_1}{V_\pi}\sin(\omega_{RF}t + \theta_1) - \frac{\pi V_2}{V_\pi}\sin(\omega_{RF}t + \theta_1 +$$

$$\pi)) + \alpha(\omega)\frac{d}{dt}P_{out})$$

$$= \frac{P_{in}}{2}(1 + \cos\left(\theta_{DC} + \frac{\pi(V_1 + V_2)}{V_\pi}\sin(\omega_{RF}t + \theta_1) + \alpha(\omega)\frac{d}{dt}P_{out}\right)$$

$$= \frac{P_{in}}{2}\left\{1 + \left[\sin\theta_{DC}\left(a - \frac{a^3}{8}\right)(1 + \alpha^2/8)\right]\sin(\omega_{RF}t) + [\cos\theta_{DC}(a^2/4 + \frac{a^4}{48})(1 + \alpha^2/4 - \alpha^4/24)]\cos(2\omega_{RF}t) + [\sin\theta_{DC}\left(\frac{a^3}{24}\right)(1 + \alpha^2/12)^{-4}]\sin(3\omega_{RF}t) + \ldots\right.$$

In comparison to Case I described above (an unchirped modulator with physical symmetry and symmetric amplitude driving), a built-in chirp produced by physical asymmetry may modify the output intensity in such a way that may gradually linearize the transfer function of a modulator and lower the $V_\pi$. The ratio of the 3rd order distortion term to fundamental may now be given by $$\left[\left(\frac{a^3}{24}\right)\bigg/\left(a - \frac{a^3}{8}\right)\right] \cdot \left[\frac{1}{(1 + \alpha^2/8)(1 + \alpha^2/12)^4}\right]. \quad \text{EQN. 100}$$

Figure 2:
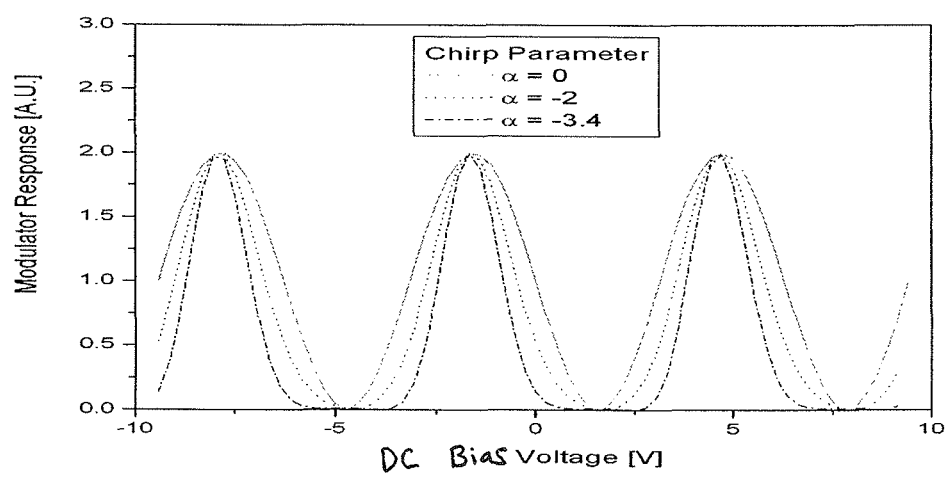
FIG. 2 is a graph illustrating exemplary transfer functions for chirped and unchirped optical modulators.

The expression in EQN. 100 contains the same prefactor as in Case I, but the ratio in EQN. 100 may be strongly affected by the device chirp parameter ($\alpha$). Larger chirp may more effectively suppress 3rd order distortion. The suppression of 3rd order distortion may result from linearization of the transfer function as shown in FIG. 2. In FIG. 2, a plot of simulated transfer functions with increasing chirp parameters is illustrated. In one aspect, a transfer function may become more linear at larger chirp parameter values (expressed in negative values). The transfer function slope may steepen which may translate to a lower $V_\pi$.

Figure 3:
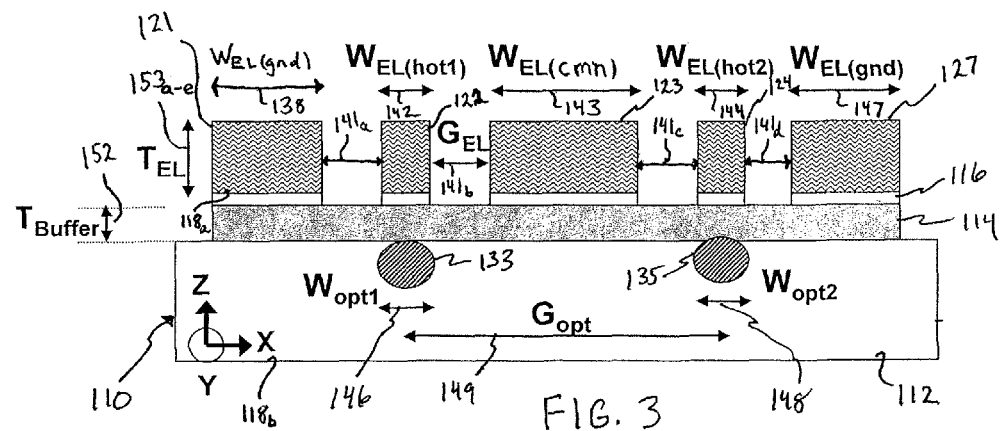
FIG. 3 is a cross-sectional view of an exemplary optical modulator in accordance with one aspect of the subject technology.
Figure 4:
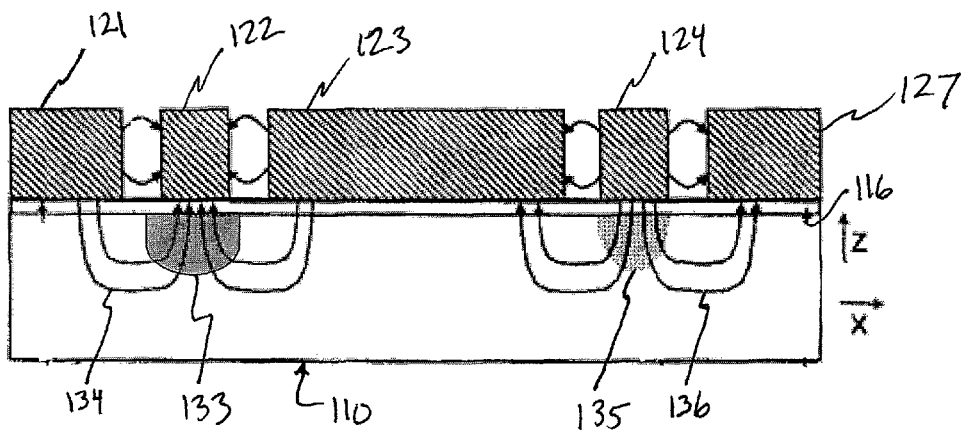
FIG. 4 is a cross-sectional view of an exemplary optical modulator with asymmetric electric fields.
Figure 5:
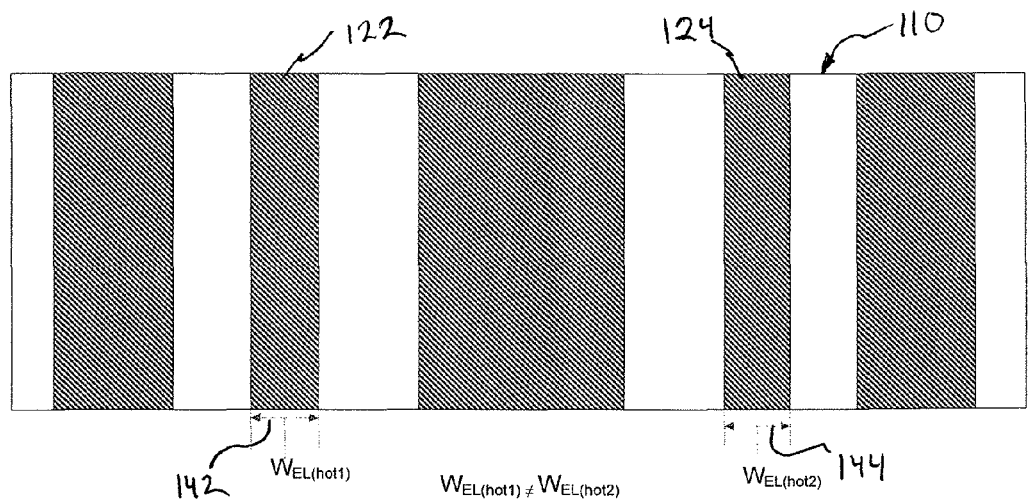
FIG. 5 is an example of a top plan view of an optical modulator.
Figure 6:
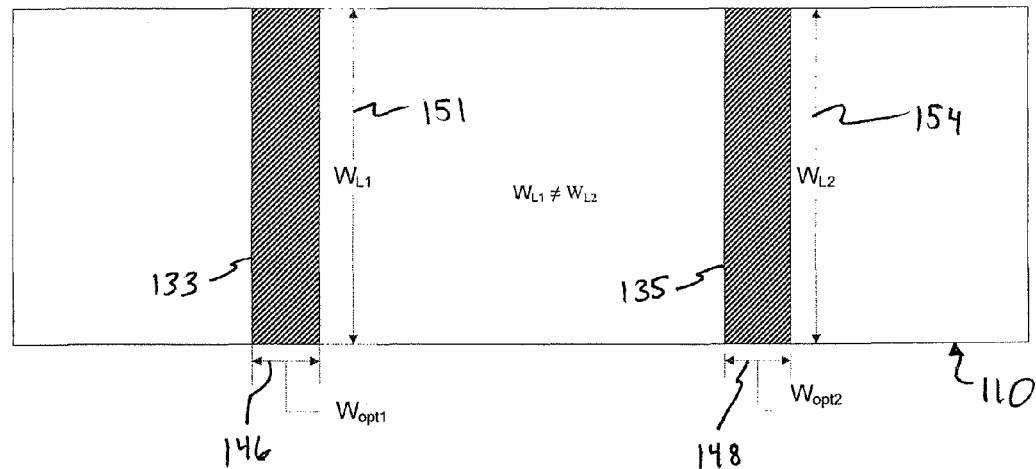
FIG. 6 is an example of a top plan view of an optical modulator.
Figure 7:
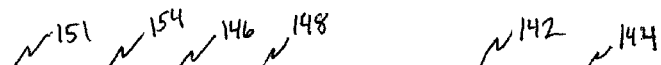
FIG. 7 is a table of exemplary dimensions of an optical modulator.

With reference now to FIGS. 3-7, exemplary configurations are illustrated for Case II. An optical modulator 110 is shown with physically asymmetric elements that may produce increased chirp under dual drive signals of equal amplitude. FIGS. 3 and 4 illustrate examples of cross-sectional views of optical modulators. FIG. 5 illustrates an example of a top plan view of an optical modulator. FIG. 6 illustrates an example of a top plan view of an optical modulator with electrodes removed for sake of illustration. FIG. 7 is a table of exemplary dimensions of an optical modulator.

Referring to FIGS. 3 and 4, in one aspect of the subject technology, waveguide elements may be configured to produce asymmetric electric fields along waveguide paths. Physical asymmetry contributing to built-in chirp may be produced by configuring a waveguide element in a group differently from another waveguide element in the same group. In one example, the dimension(s) (e.g., the width, length) of a waveguide element in a group may be configured differently from the dimension(s) of another waveguide element in the same group. In one aspect, chirp may be produced by physical asymmetry in waveguide elements (e.g., different dimensions(s) among some or all of the waveguide elements that belong to the same group). For example, an optical modulator 110 may be configured with waveguide elements of differing dimensions to produce asymmetric electric fields 134 and 136. In one example, the dimension of a first type (e.g., width) for a first waveguide element in a group may be configured differently from the dimension of the same first type (e.g., width) for a second waveguide element in the same group. Alternatively or in addition, the dimension of a second type (e.g., length) for the first waveguide element in the group may be configured differently from the dimension of the same second type (e.g., length) for the second waveguide element in the same group. In the foregoing sentences, while width is described as an example of the first type, and length is described as an example of the second type, the first and second type examples may be reversed (e.g., the first type may represent the length, and the second type may represent the width). Furthermore, each of the first type and the second type may represent another type of dimension. For example, another dimension type may include a thickness of a waveguide element.

In one aspect, waveguide elements may be configured in groups (e.g., pairs). Waveguide elements may include, for example, waveguides, hot electrodes, and/or ground electrodes. In one example, a group may include a pair of waveguides such as waveguide 133 and waveguide 135. In another example, a group may include a pair of hot electrodes, such as hot electrode 122 and hot electrode 124. In yet another example, a group may include ground electrodes, such as ground electrode 121 and ground electrode 127. In yet another example, a group may include (i) common ground electrode 123 and ground electrode 121, (ii) common ground electrode 123 and ground electrode 127, or (iii) some combination thereof. In one aspect, a group includes at least two waveguide elements that are of the same kind (e.g., waveguides are one kind of waveguide elements, and hot electrodes are another kind of waveguide elements.)

In one example, if a first group includes a first waveguide arm and a second waveguide arm, and a second group includes a first hot electrode and a second hot electrode, then the dimension of a first type for the first waveguide arm may be different from the dimension of the first type for the second waveguide arm. Alternatively or in addition, the dimension of a second type for the first hot electrode may be different from the dimension of the second type for the second hot electrode. In one aspect, the first and second types may be two different types (e.g., if the first type is width, then the second type is length). In another aspect, the first type and the second type may be the same type. Each of the first type and the second type may be the width, length, or another type of dimension.

With reference to FIG. 3, a cross section of an optical modulator 110 according to one aspect of the subject technology is shown. An optical modulator 110 may include waveguides 133 and 135. Waveguides 133 and 135 may be sometimes referred to as waveguide arms, arms, waveguide legs, and waveguide paths. Waveguides 133 and 135 may be formed within a substrate 112 of electro-optical material. One example of an electro-optical material that may be employed may be lithium niobate. A buffer layer 114 may be disposed proximate or laid atop the electro-optical material substrate 112. The optical modulator 110 may also include a pair of hot electrodes 122 and 124. The hot electrodes 122 and 124 may each be disposed on the buffer layer 114 proximate waveguides 133 and 135 respectively. A common ground electrode 123 may be disposed between the hot electrodes 122 and 124. Ground electrodes 121 and 127 may be disposed outside of hot electrodes 122 and 124 respectively so that the hot electrodes 122 and 124 may each be disposed between the common ground electrode 123 and the ground electrodes 121 and 127 respectively. The hot electrodes 122 and 124, and the ground electrodes 121, 123, and 127 may be affixed to the buffer layer 114 by means of an adhesion layer 116 of adhesive material. The optical modulator 110 may also include charge bleed layers $118_a$ and $118_b$.

The aforementioned waveguide elements of FIG. 3 may have dimensions as illustrated in FIGS. 3, 5, and 6. The hot electrodes 122 and 124 may comprise a hot electrode width 142 ($W_{EL(hot1)}$) and 144 ($W_{EL(hot2)}$) respectively. The hot electrodes 122 and 124 may also comprise hot electrode lengths 151 ($W_{L1}$) and 154 ($W_{L2}$) respectively. Ground electrode widths 138 ($W_{EL(gnd)}$), 143 ($W_{EL(cmn)}$), and 147 ($W_{EL(gnd)}$) may be associated with ground electrodes 121, 123, and 127 respectively. Gaps ($G_{EL}$) $141_a$, $141_b$, $141_c$, and $141_d$ may refer to respective distances between a hot electrode and a ground electrode as illustrated. Hot electrodes 122 and 124 and ground electrodes 121, 123, and 127 may include respective electrode thicknesses ($T_{EL}$) $153a$, $153b$, $153c$, $153d$, and $153e$ (shown for sake of illustration as one uniform thickness) which may be uniform or of different thickness depending on what waveguide elements are configured for asymmetry. The buffer layer may include a thickness ($T_{buffer}$) 152. Waveguide 133 may include a waveguide width ($W_{opt1}$) 146 and waveguide 135 may include a waveguide width ($W_{opt2}$) 148. A distance between centers of waveguides 133 and 135 may be designated as $G_{opt}$ 149.

With reference to FIGS. 5-7, exemplary embodiments illustrating waveguide elements with asymmetric dimensions are shown. FIG. 5 illustrates an example in which the optical modulator 110 is configured with hot electrodes of unequal widths. For example, hot electrode width 142 ($W_{EL(hot1)}$) of hot electrode 122 may be different from hot electrode width 144 ($W_{EL(hot2)}$) of hot electrode 124. FIG. 6 illustrates another aspect of an optical modulator 110 such as having waveguide lengths and/or widths of unequal dimensions. In one aspect, the optical modulator 110 may include waveguide arms 133 and 135 of different lengths. Waveguide arm 133 may comprise a waveguide length 151 ($W_{L1}$) that may not equal the waveguide length 154 ($W_{L2}$) of waveguide arm 135. In another aspect, the optical modulator 110 may include waveguide arms 133 and 135 of different widths. Waveguide arm 133 may comprise a waveguide width 146 ($W_{opt1}$) that may not equal the waveguide width 148 ($W_{opt2}$) of waveguide arm 135.

FIG. 7 shows a table illustrating examples of waveguide element dimensions in various configurations that may produce chirp by physical asymmetry in an optical modulator in accordance with aspects of the subject disclosure. The table depicts exemplary dimensional sizes in accordance with the dimensions and aspects described in FIGS. 3-6. Row 1 illustrates one exemplary configuration of the optical modulator 110 where unequal hot electrode widths 142 ($W_{EL(hot1)}$) and 144 ($W_{EL(hot2)}$) may be employed. In this example, chirp may be produced by configuring the optical modulator 110 with a first hot electrode width 142 ($W_{EL(hot1)}$) of 12 μm and a second hot electrode width 144 ($W_{EL(hot2)}$) of 18 μm. Row 2 illustrates an exemplary configuration of the optical modulator 110 employing unequal waveguide widths 146 ($W_{opt1}$) and 148 ($W_{opt2}$). In this example, chirp may be produced by configuring the optical modulator 110 with a first waveguide arm 133 having a waveguide width 146 ($W_{opt1}$) of 12 μm and a second waveguide arm 135 having a waveguide width 148 ($W_{opt2}$) of 8 μm. Row 3 illustrates an exemplary configuration of the optical modulator 110 using different waveguide lengths. In this example, chirp may be produced by configuring the optical modulator 110 with a first waveguide arm 133 with a waveguide length 151 ($W_{L1}$) of 2 cm and a second waveguide arm 135 with a waveguide length 154 ($W_{L2}$) of 1.6 cm.

Figure 8A:
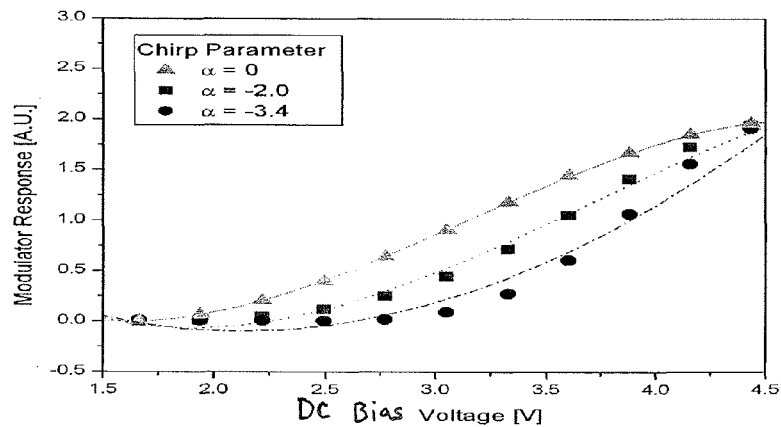
FIG. 8A is a graph illustrating an exemplary comparison of transfer functions for different chirp values to their 3rd order polynomial fit.

Referring now to FIGS. 8A, 8B, 9 and 10, exemplary data are shown for various chirp parameters. FIG. 8A illustrates a plot of 3rd order polynomial fits to one-side slope sections of the transfer functions from FIG. 2.

Figure 8B:
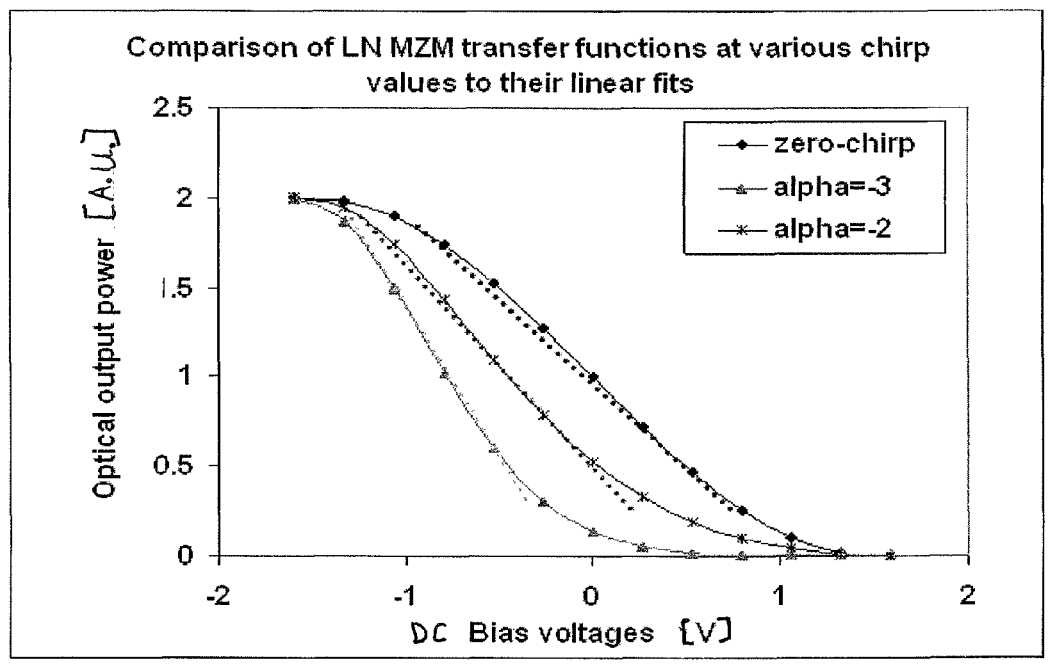
FIG. 8B is a graph illustrating an exemplary comparison of transfer functions for different chirp values to their linear fit.

FIG. 8A illustrates a perfect fit to the sinusoidal function corresponding to a normal zero chirped optical modulator (α=0 A.U.) as represented by the triangle-shape curve. As the transfer function becomes more linear, the 3rd order fit shows larger deviations from more linearized functions showing increasingly greater 3rd order suppression. For example, the triangle-shape curve where the chirp parameter may be approximately zero results in the worst linearity, and the circle-shape curve representing a chirp parameter of approximately −3.4 A.U. depicts the best linearity. The square-shape curve representing a chirp parameter of approximately −2.0 A.U. illustrates intermediate linearity. FIG. 8B illustrates a plot of the linear fits of the transfer functions from FIG. 2 at approximately the same chirp parameters of FIG. 8A.

FIG. 8B illustrates the inverse relation between 3rd order presence and linearity for a given range. For an exemplary DC bias voltage range (e.g., 0V to 3V which may translate to a range of 0-180 degrees in DC bias angle), the higher the chirp parameter, the more linear the transfer function of the optical modulator. In this exemplary plot, the triangle-shape curve represents a chirp parameter of approximately −3 A.U., which illustrates a steeper slope and higher linearity as compared with the asterisk-shape curve and the circle-shape curve which represent a chirp parameter of approximately −2 A.U. and 0 A.U., respectively. An exemplary frequency of an RF signal may be between 1 MHz and 10 GHz. It should be noted that the subject technology, however, is not limited to these exemplary DC bias voltage ranges or frequency ranges.

Figure 9:
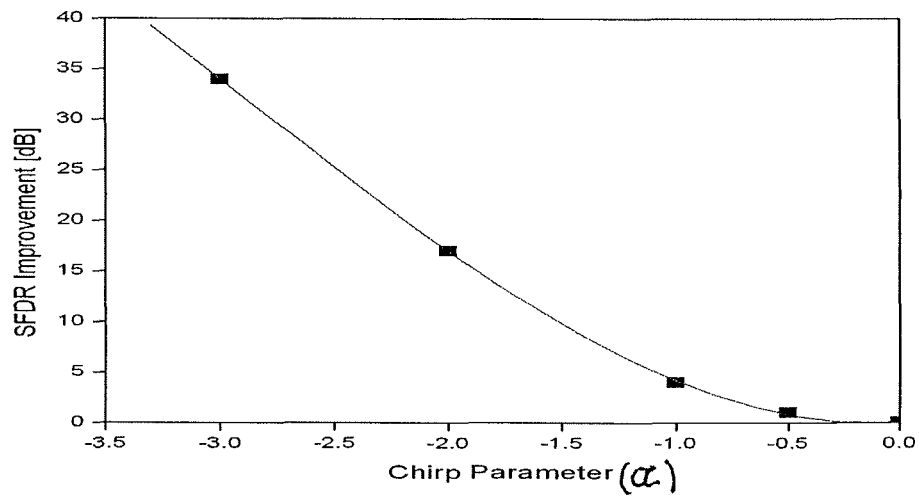
FIG. 9 is a graph illustrating spur-free dynamic range (SFDR) performance relative to exemplary chirp parameters.

FIG. 9 illustrates a plot of the OIP3 suppression ratio or SFDR improvement as a function of chirp parameter. The 3rd order suppression ratio appears to improve significantly as chirp parameter becomes much larger than −2 A.U. At a chirp parameter of −3.4 A.U., the 3rd suppression ratio can reach 34 dB, which extends OIP3 beyond 50 dBm and SFDR greater than 145 dB/Hz 3/2. Large enough chirps may be helpful in trying to linearize the transfer function of an optical modulator. For chirp induced linearization, the transfer function symmetry may be preserved so that the 2nd harmonic may be suppressed at quadrature biasing.

Figure 10:
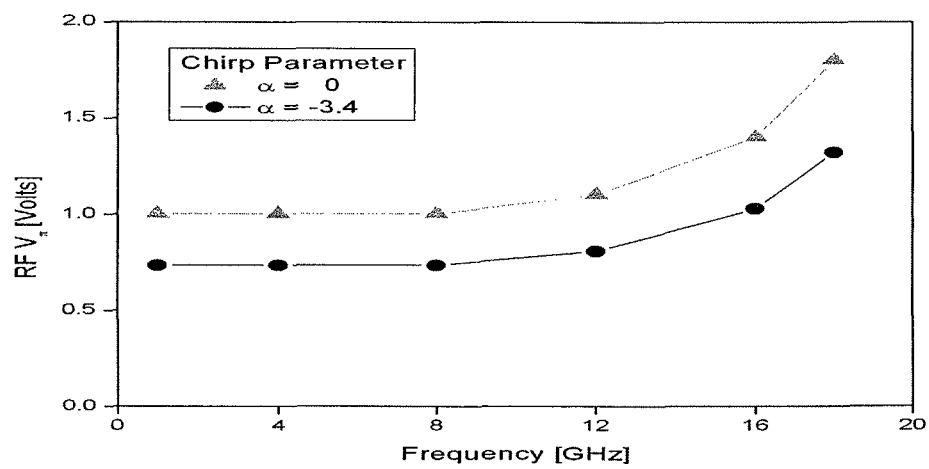
FIG. 10 is a graph illustrating an exemplary RF $V_\pi$ performance of an unchirped modulator in comparison to a chirped modulator.

FIG. 10 illustrates a comparison in Vπ with chirp (e.g., α=−3.4) and without chirp (α=0) as a function of frequency bandwidth for the same electrode design. In one aspect, the Vπ may be reduced for a chirped optical modulator. A lower Vπ optical modulator can be achieved by chirping to balance a tradeoff between the lower Vπ and the lower bandwidth.

Case III: Dual Arm Drive Modulator: Physical Symmetry; Asymmetric RF Drive Amplitude (α=0, $V_1 \neq V_2$, b≠0)

In one aspect, a may represent a built-in chirp parameter, $V_1$ may represent the amplitude of an RF signal applied to a first one of the waveguides, $V_2$ may represent the amplitude of an RF signal applied to a second one of the waveguides, and $$b = \frac{\pi(V_1 - V_2)}{V_\pi}.$$

In this exemplary scenario, an output intensity may be expressed as follows:

$$P_{out} = \frac{P_{in}}{2}\left(1 + \cos\left(\theta_{DC} + \frac{\pi V_1}{V_\pi}\sin(\omega_{RF}t + \theta_1) - \frac{\pi V_2}{V_\pi}\sin(\omega_{RF}t + \theta_2)\right)\right)$$

-continued $$= \frac{P_{in}}{2}\{1 + [\sin\theta_{DC}(1 + \sin^2(\phi_0))\sin^2(\phi_0 + b/2)(a - \frac{a^3}{8})]\sin(\omega_{RF}t) + [\cos\theta_{DC}(1 + \sin^4(\phi_0))\sin^4(\phi_0 + b/4)(a^2/4 + \frac{a^4}{48})]\cos(2\omega_{RF}t) + [\sin\theta_{DC}(1 + \sin^6(\phi_0))\sin^6(\phi_0 + b/6)\left(\frac{a^3}{24}\right)]\sin(3\omega_{RF}t) + \ldots \}.$$

If the drive signals on the waveguide arms are of equal amplitude with 180 degree differential phase ($V_1=V_2$, b=0, $\theta_1-\theta_2=\pi$), the above equation again reduces to a standard transfer function corresponding to a differential dual drive optical modulator. If the two drives are of the same phase and same amplitude ($V_1=V_2$, b=0, $\theta_1-\theta_2=0$), then the equation may describe that the output of the optical modulator has no modulation. If the drive signals on the arms are of the same phase but different amplitudes ($V_1 \neq V_2$, b≠0, $\theta_1-\theta_2=0$), then the equation may reduce to an equivalent single drive optical modulator with driving voltage of $V_1-V_2$. If the drive signals on the arms are of equal amplitude but a phase other than 0 or π ($V_1=V_2$, b=0, $\theta_1-\theta_2\neq\pi$, $\theta_1-\theta_2\neq0$), the above equation may reduce to a standard transfer function corresponding to a dual drive optical modulator with arbitrary phases. The extinction ratio (e.g., $P_{out}$ at peak/$P_{out}$ at null) may be the highest when the phase difference, $\theta_1-\theta_2$, is 180 degrees and may reach zero when the phase difference is zero.

Figure 11:
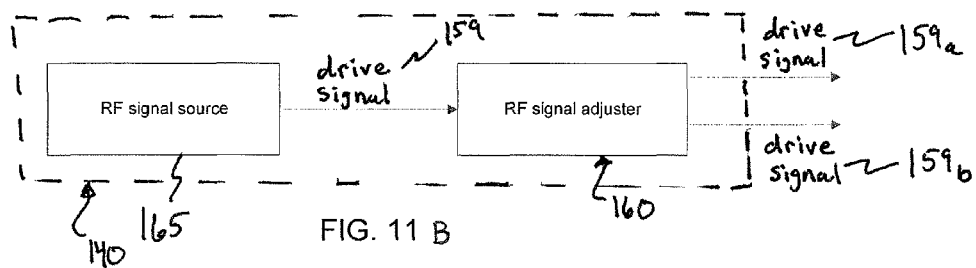
FIG. 11A is a graph illustrating an example of asymmetric dual drive signals for use with an optical modulator.
FIG. 11B is a conceptual block diagram illustrating an example radio frequency (RF) module.
FIG. 11C is a conceptual block diagram illustrating an example of an optical modulator apparatus.
FIG. 11D is a conceptual block diagram illustrating an example of a bias controller.
FIG. 11E is a conceptual block diagram illustrating an example of an analog system employing externally driven chirp.
Figure 11:
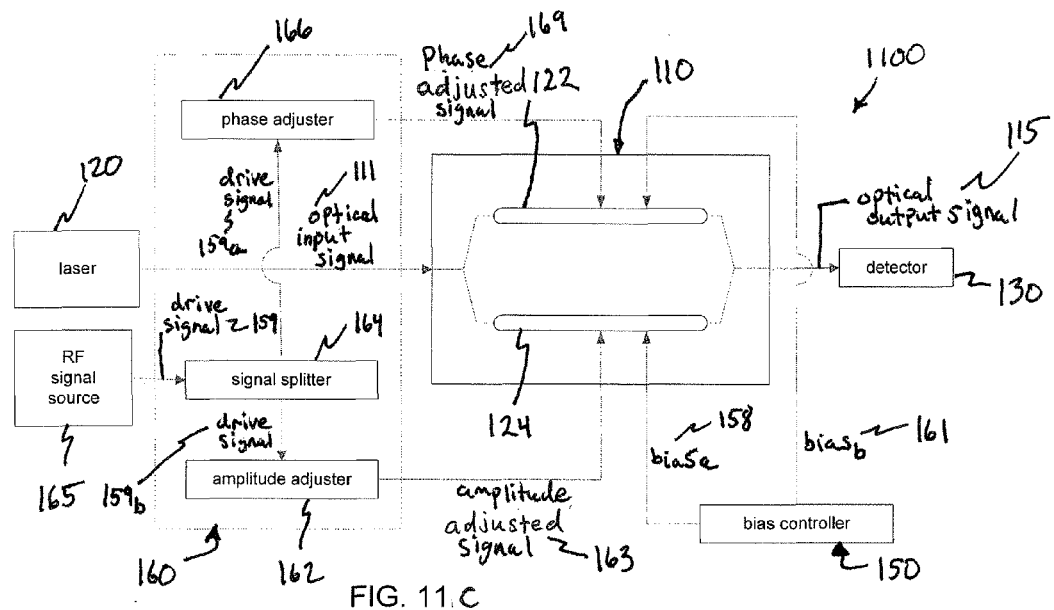
Figure 11:
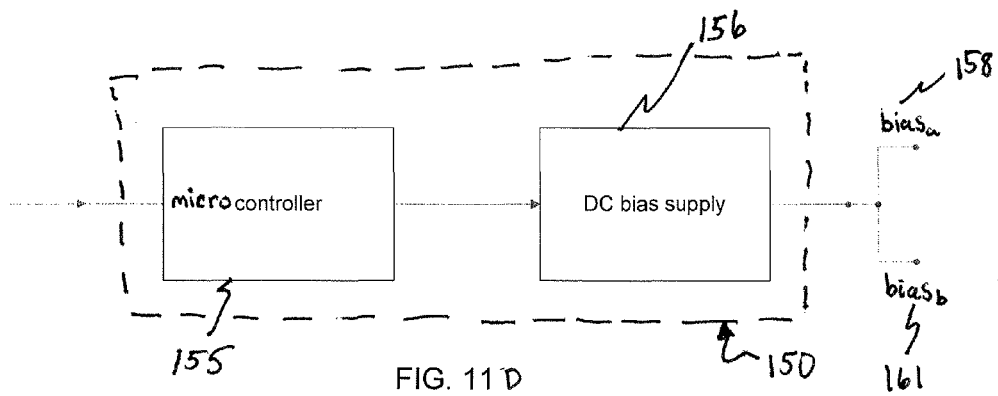

For Case III and with reference to FIG. 11A, in one aspect of the disclosure, chirp may be produced by driving hot electrodes of waveguide arms with asymmetric signals. In one example, the built-in chirp parameter is zero (α=0), and an optical modulator is under asymmetric dual drive signals of unequal amplitude ($V_1 \neq V_2$, b≠0) (e.g., the amplitudes of the RF drive signals $V_1$ and $V_2$ are different) and unequal phase (e.g., $\theta_1-\theta_2\neq\pi$, $\theta_1-\theta_2\neq0$). In one aspect, each waveguide arm may carry an input optical signal which may be modulated according to an asymmetric RF input signal affecting the electro-optical material proximate each waveguide arm. In one aspect, each waveguide arm may be disposed proximate a respective hot electrode that may be driven by a distinct voltage.

Distinct voltage inputs into each hot electrode may generate asymmetric electric fields around respective waveguide arms of differing phase and amplitude. If the drive signals on the arms are of slightly different amplitude ($V_1 \neq V_2$), the above equation may indicate that the extinction ratio reaches maximum at a slight offset from 180 degrees (e.g., when the phase difference ($\theta_1-\theta_2$) is approximately 150 degrees to 170 degrees). An exemplary maximum extinction ratio may be approximately 14 dB at 10 GHz. The last scenario described above, where the two drives are of different amplitude ($V_1 \neq V_2$) and the phase difference ($\theta_1-\theta_2$) is slightly offset from 180 degrees, is an example of Case III. For Case III, while the phase difference ($\theta_1-\theta_2$) may be, for example, a value between 150 degrees to 170 degrees as describe above, the subject technology is not limited to these values (e.g., the phase difference may be a value that is not 0 degrees, 90 degrees, 180 degrees, 270 degrees, or 90*m degrees where m is 0, a positive integer, or a negative integer.)

In one aspect of the disclosure, exemplary configurations for Case III are illustrated below with respect to FIGS. 11B-11E.

FIG. 11B illustrates an exemplary driving mechanism to produce chirp in accordance with one aspect of the subject disclosure. In one aspect, chirp can be produced as described above, by externally driving electric field asymmetry on a symmetric dual drive optical modulator. Referring concurrently to FIGS. 1A and 11B, the RF module 140 may, in one aspect, comprise an RF signal source 165 and an RF signal adjuster 160. In one aspect, the RF signal source 165 may be configured for use in analog applications to asymmetrically drive the optical modulator 110. The RF signal source 165 may be, for example, an antenna, a receiver, an optical fiber transmitting a light signal, or a connection coupled to the optical modulator 110, an antenna, a receiver, an optical fiber, or a port of a signal generator/transmitter. In one aspect, the RF signal adjuster 160 may split a drive signal 159 received from the RF signal source 165 into two separate drive signals 159a and 159b. In one aspect, the RF signal adjuster 160 may adjust the amplitude of a drive signal 159 and/or the phase of a drive signal 159. In one exemplary embodiment, the RF signal source 165 and the RF signal adjuster 160 may be employed under the following exemplary configuration.

Referring now to FIG. 11C, an optical modulation apparatus 1100 is shown. The optical modulation apparatus 1100 may generally include an optical modulator 110, a laser 120, an RF signal source 165, an RF signal adjuster 160, a bias controller 150, and a detector 130.

The optical modulator 110 shown in FIG. 11D may have a structural representation similar to that of an optical modulator 110 shown in FIG. 4. For example, like the optical modulator 110 of FIG. 4, the optical modulator 110 of FIG. 11B may include hot electrodes 122 and 124, waveguide arms 133 and 135, ground electrodes 121 and 127, and a common ground electrode 123 as shown in FIG. 4. However, the dimensions of these elements utilized with respect to the optical modulation apparatus 1100 for Case III may be different from the dimensions of the same elements utilized for Case II described above.

In FIG. 11C, the RF signal adjuster 160 may be coupled to hot electrodes 122 and 124. The bias controller 150 may also be coupled to the hot electrodes 122 and 124. In one example, waveguide elements may be configured for physical symmetry. For example, the width and length of hot electrode 122 may be the same as the width and length of hot electrode 124, and the width and length of the waveguide arms may be the same. In operation, asymmetric electric fields may be generated according to asymmetric drive signals input to drive respective hot electrodes 122 and 124 by the RF module 140 and bias controller 150.

Electric field asymmetry may be produced based on configurations associated with the RF signal adjuster 160. For sake of illustration, one aspect is illustrated as employing the RF signal adjuster 160 comprising a signal splitter 164, an amplitude adjuster 162, and a phase adjuster 166. The amplitude adjuster 162 may be coupled to the hot electrode 124, and the phase adjuster 166 may be coupled to the hot electrode 122. Other configurations may be employed as described further below in the subject disclosure.

In operation, the laser 120 may transmit an optical input signal 111 into an optical modulator 110. The optical input signal 111 may be split into two beams, each traveling through or along one of two waveguide arms concurrently. The waveguide arms will be understood as being disposed proximate the hot electrodes 122 and 124. The RF signal source 165 may transmit a modulating drive signal 159 through the RF signal adjuster 160. The drive signal 159 may include data for the hot electrodes 122 and 124 to generate an optical output signal 115 of desired amplitude and phase from respective waveguides in the optical modulator 110. The drive signal 159 may be retransmitted by the signal splitter 164 so that each of the amplitude adjuster 162 and the phase adjuster 166 receives a copy or a representation (e.g., $159_a$ and $159_b$) of the drive signal 159. The amplitude adjuster 162 may adjust the amplitude of the drive signal $159_b$ to produce an amplitude adjusted signal 163. The amplitude adjusted signal 163 may be used to drive hot electrode 124. In this example, the amplitude of the amplitude adjusted signal 163 is not the same as the amplitude of the signal driving electrode 122 in the optical modulator 110. The phase adjuster 166 may adjust the phase of the drive signal $159_a$ to produce a phase adjusted signal 169, which is used to drive the hot electrode 122. In this example, the phase adjusted signal 169 is at a different phase than the signal driving hot electrode 124.

Additionally, bias signals applied to hot electrodes 122 and 124 may be controlled by the bias controller 150. Referring to FIGS. 1A, 11C and 11D concurrently, the bias controller 150 may comprise a microcontroller 155 and a DC bias supply 156. The microcontroller 155 may determine the bias voltage level to be applied to each hot electrode 122, 124 and produce a bias input signal for each of hot electrodes 122 and 124. In one aspect, the biasing may comprise a signal $bias_a$ 158 for biasing hot electrode 124 and a signal $bias_b$ 161 for biasing hot electrode 122. The DC bias supply 156 may supply the bias voltage. In one example, the amplitude of the signal $bias_a$ 158 is the same as the amplitude of the signal $bias_b$ 161. In one example, the signal $bias_a$ 158 and the signal $bias_b$ 161 may represent a bias input signal 157 in FIG. 1A.

Figure 11E:
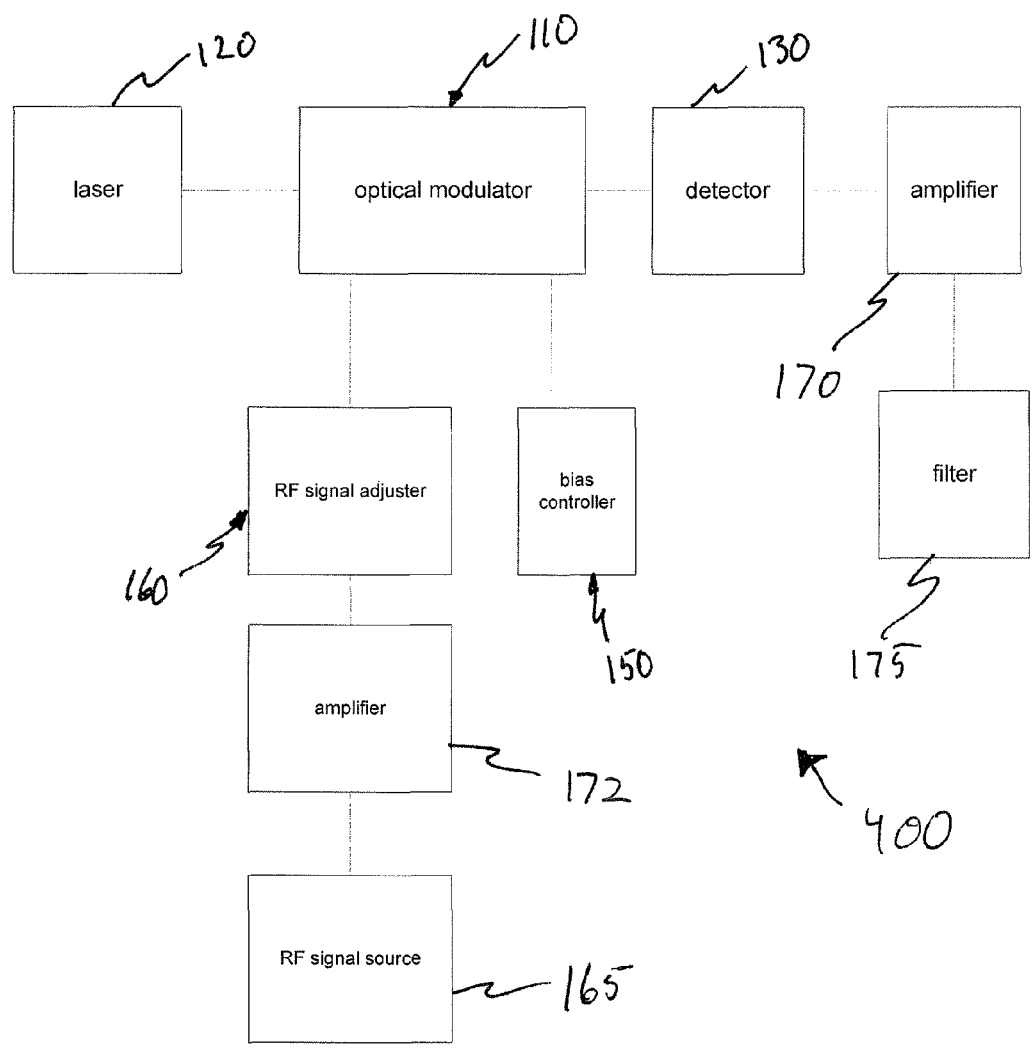

Referring to FIG. 11E, an exemplary analog system 400 employing external asymmetric drives as described under Case III is illustrated. The analog system 400 may include an optical modulator 110, a laser 120, a detector 130 (e.g., a linear photodetector), an amplifier 170 (e.g., a low noise amplifier), and a filter 175 (e.g., a narrowband filter). An optical input signal received by the optical modulator 110 may be modulated by RF input signals provided by an RF signal adjuster 160 and a bias controller 150. A second amplifier 172 may be coupled to the RF signal source 165 amplifying RF signals that may be provided to an RF signal adjuster 160. The RF signal adjuster 160 may be configured similarly to the embodiment shown in FIG. 11C to produce asymmetry from an external drive source on the optical modulator 110. For example, the RF signal adjuster 160 in the analog system 400 may be configured to provide asymmetric drive signals to the optical modulator 110 differing, for example, in amplitude and phase. It should be noted that the configuration shown in FIG. 11E may be also utilized for Case II, where an RF signal adjuster may, for example, adjust the phase difference (e.g., $\theta_1 - \theta_2 = \pi$) but not the amplitudes of the drive signals.

Figure 12:
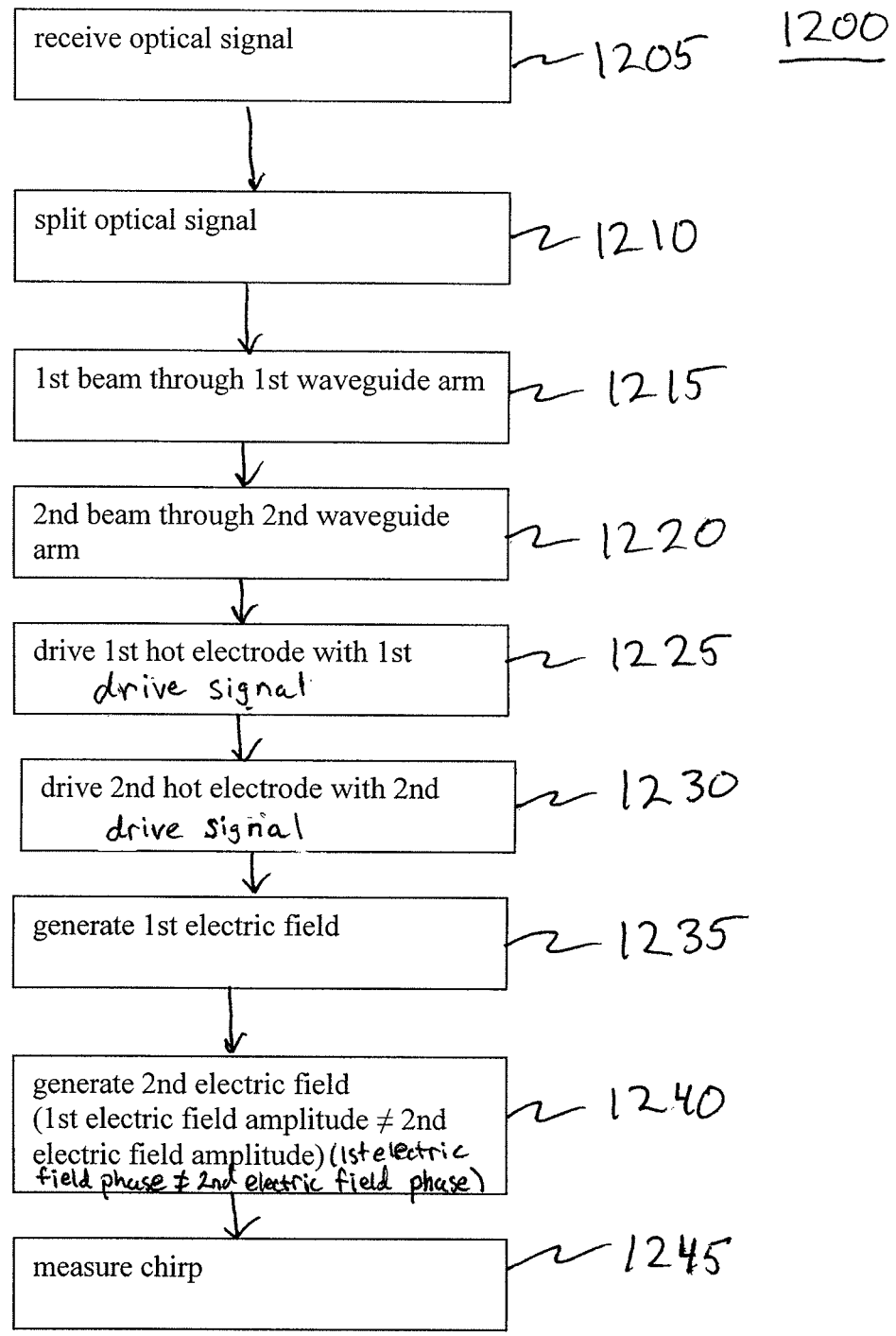
FIG. 12 is a block diagram illustrating an example of a method of modulating an optical signal.

FIG. 12 illustrates a method of producing chirp by externally driving a dual waveguide optical modulator with asymmetric signals (e.g., Case III described above). This method can produce asymmetric electric fields at the waveguides. In operation 1205, an optical modulator may receive an optical input signal. In operation 1210, the optical input signal may be split into two beams. In operation 1215, the first (1st) beam may be transmitted through a 1st waveguide arm. In operation 1220, the second (2nd) beam may be transmitted through a 2nd waveguide arm. Operations 1215 and 1220 may occur concurrently (or simultaneously). In operation 1225, a 1st hot electrode disposed proximate the 1st waveguide arm may be driven with a 1st drive signal. The 1st drive signal may be from an analog signal source. A bias controller may supply a bias voltage to the 1st hot electrode. In operation 1230, a 2nd hot electrode disposed proximate the 2nd waveguide arm may be driven with a 2nd drive signal. The 2nd drive signal may be from an analog signal source. A bias controller may supply a bias voltage to the 2nd hot electrode. Operations 1215, 1220, 1225, and 1230 may occur concurrently. In operation 1235, a 1st electric field may be generated in conjunction with the 1st waveguide arm. In operation 1240, a 2nd electric field may be generated in conjunction with the 2nd waveguide arm. In this example, the amplitude of the 2nd electric field does not equal the amplitude of the 1st electric field and the phase of the 2nd electric field does not equal the phase of the 1st electric field. Operations 1235 and 1240 may occur concurrently. In operation 1245, chirp produced in the optical modulator may be measured.

Figure 13:
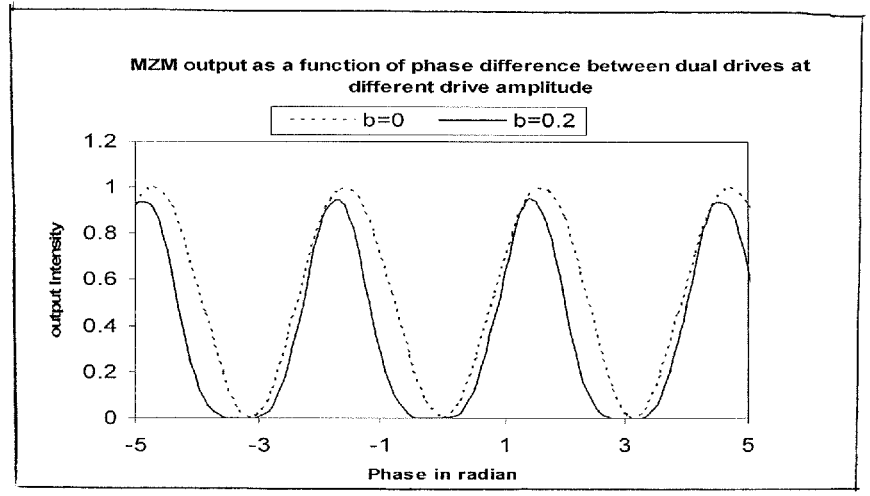
FIG. 13 is a graph illustrating performance examples of modulators operating at different drive amplitudes.

FIG. 13 illustrates an example of (i) a plot of a transfer function for an asymmetrically driven optical modulator when b=0 and (ii) a plot of a transfer function for an asymmetrically driven optical modulator when b=0.2 (an example of Case III). The transfer function may exhibit gradual linearization in a fashion similar to that of an optical modulator with physical asymmetry (e.g., Case II) where intrinsic (built-in) waveguide chirp may contribute to the optical modulator linearization. In this scenario (an example of Case III), the asymmetric driving condition in the optical modulator may induce chirp in the optical modulator. The ratio of the 3rd order distortion term to fundamental for Case III may now be given by:

$$\left[\left(\frac{a^3}{24}\right) \bigg/ \left(a - \frac{a^3}{8}\right)\right] \cdot \frac{(1 + \sin^6(\phi_0))\sin^6(\phi_0 + b/6)}{(1 + \sin^2(\phi_0))\sin^2(\phi_0 + b/2)}$$

where $$a = \frac{\pi(V_1 + V_2)}{V_\pi}, \quad b = \frac{\pi(V_1 - V_2)}{V_\pi},$$

$\phi_0 = (\theta_1 - \theta_2)/2$, where $V_1$ represents the amplitude of a first RF drive signal, where $V_2$ represents the amplitude of a second RF drive signal, where $V_\pi$ represents a bias voltage difference between a peak and a null of a transfer function curve associated with the optical modulator, and $\theta_1 - \theta_2$ is the difference between the phase of the first RF drive signal and the phase of the second RF drive signal.

The 3rd order distortion terms may thus be affected by device chirp (e.g., chirp induced by external asymmetric drives). In particular, the 3rd-order intermodulation distortion may be suppressed when b falls within a range such that the numerator decreases faster than the denominator. On exemplary range is approximately 2.5 dB-4.0 dB. As in the case of an optical modulator with physical asymmetry (e.g., Case II), an optical modulator's transfer function may have increased linearization as a result of the chirp (e.g., chirp induced by external asymmetric drives). The $V_\pi$ of a chirped optical modulator may also be lowered as compared to that of a zero chirped configuration.

Figure 14:
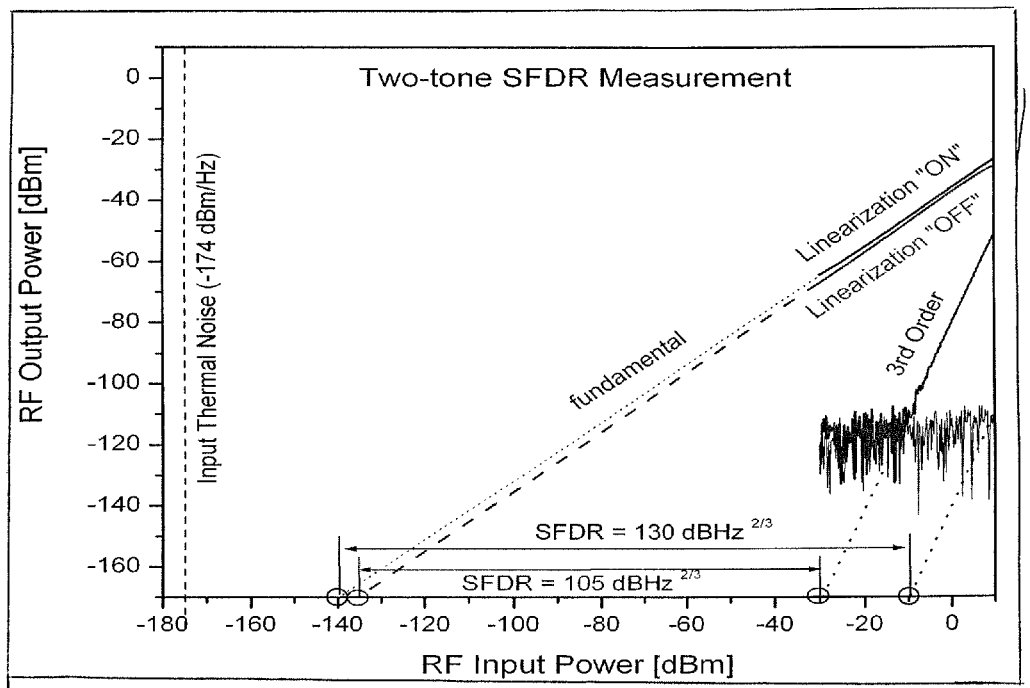
FIG. 14 is a graph illustrating an example of a two-tone SFDR measurement.

Experimentally, the concept of optical modulator linearization via external driving asymmetry on a dual drive, zero built-in chirp optical modulator (which is an example of Case III) may be supported according to the following data results. In one aspect of the subject technology, a configuration similar to the optical modulation apparatus 1100 shown in FIG. 11B is employed. Two drive voltages (e.g., signals 163 and 169 in FIG. 11B) may be applied to the dual drive optical modulator with a splitting ratio such as 4.5-5.5 dB and a phase offset or phase difference such as 150°-170°. In one example, a signal splitter 164 (as shown in FIG. 11B) may provide the splitting ratio, and a phase adjuster 166 of FIG. 11B may provide a phase offset. As illustrated in the two-tone SFDR measurement in FIG. 14, over 20 dB improvement in SFDR (linearization "on") over a conventional optical modulator (linearization "off") may be seen.

Case IV: Dual Arm Drive Modulator; Physical Asymmetry; Asymmetric RF Drive Amplitude ($\alpha \neq 0$, $V_1 \neq V_2$, $b \neq 0$)

In one aspect, a may represent a built-in chirp parameter, $V_1$ may represent the amplitude of an RF signal applied to a first one of the waveguides, $V_2$ may represent the amplitude of an RF signal applied to a second one of the waveguides, and $$b = \frac{\pi(V_1 - V_2)}{V_\pi}.$$

In one aspect of the subject technology, chirp can be induced and controlled by employing both physical asymmetry in the optical modulator and by employing external asymmetric drives. In one aspect, Case IV may be viewed as a combination of Case II and Case III. For Case IV, in one aspect of the disclosure, an optical modulator utilizes built-in chirps and operates under dual drive with unequal amplitude. Stated in another way, in one aspect, the built-in chirp parameter is not zero ($\alpha \neq 0$), and the amplitudes of the RF drive voltages are different ($V_1 \neq V_2$).

In one aspect, the output intensity may be described in the general form that was derived earlier according to EQN. 100.

The optical output intensity from an optical modulator can be written as:

$$P_{out} \approx \frac{P_{in}}{2}\left\{1 + \left[\sin\theta_{DC}(1 + \sin^2(\phi_0))\sin^2(\phi_0 + b/2)\left(a - \frac{a^3}{8}\right)(1 + \alpha^2/8)\right]\right.$$
$$\sin(\omega_{RF}t) + \left[\cos\theta_{DC}(1 + \sin^4(\Phi_0))\sin^4(\phi_0 + b/4)\left(a^2/4 + \frac{a^4}{48}\right)\right.$$
$$\left.(1 + \alpha^2/4 - \alpha^4/24)\right]\cos(2\omega_{RF}t) + \left[\sin\theta_{DC}(1 + \sin^6(\phi_0))\right.$$
$$\left.\left.\sin^6(\phi_0 + b/6)\left(\frac{a^3}{24}\right)(1 + \alpha^2/12)^{-4}\right]\sin(3\omega_{RF}t) + \ldots\right.$$

The ratio of the 3rd order distortion term to fundamental may be given by $$\left[\left(\frac{a^3}{24}\right) \bigg/ \left(a - \frac{a^3}{8}\right)\right] \cdot \frac{(1 + \sin^6(\phi_0))\sin^6(\phi_0 + b/6)}{(1 + \sin^2(\phi_0))\sin^2(\phi_0 + b/2)}\left[\frac{1}{(1 + \alpha^2/8)(1 + \alpha^2/12)^4}\right].$$

With large enough built-in chirp parameter and optimal offsets between asymmetric drives, built-in chirp induced linearization and asymmetric external drive induced linearization may be combined to further extend achievable SFDR. In one aspect, asymmetric external drive may include providing dual signals of different phases and different amplitudes In one aspect, the induced linearization may be accompanied by higher order (5th, 7th, etc) distortions. Although much higher order spurs may be intrinsically weak, their presence may not be ignored once the distortion becomes more pronounced. The upper bound of chirp induced linearization may be affected by the onset of higher order distortions.

Chirp based linearization techniques in accordance with the subject disclosure may derive from mature optical modulator technology and may be conducive to implement in real-field deployment. The technology may be applicable to, for example, a Mach-Zehnder based modulator technology.

High performance analog links for microwave transmission may be one of the next generation technologies in realizing low SWaP (size, weight, and power) for military communication applications. Some state-of-the-art analog links may suffer low efficiency and poor dynamic range in comparison to their electrical counterparts although they may offer a light weight and immunity to electromagnetic radiation. Improving analog link performance may become significant to defense companies. Some applications that may benefit from aspects of the subject technology may include analog antenna communications.

While aforementioned aspects of the subject technology have been described in the context of implementing the use of a phase adjuster on one hot electrode and an amplitude adjuster on another hot electrode in an optical modulator (see, e.g., FIG. 11B), other configurations are also possible. For example, one configuration may employ the use of an amplitude adjuster (e.g., 162) on each hot electrode 122, 124 in an optical modulator 110. In operation, each hot electrode 122, 124 may be driven at amplitudes that do not equal one another. According to another aspect, the RF signal adjuster 160 may use a phase adjuster (e.g., 166) on each hot electrode 122, 124 in an optical modulator. In operation, each phase adjuster 166 may drive each hot electrode 122, 124 to produce a respective modulated signal through respective waveguides at two different phases. In another aspect, both the phase adjuster 166 and amplitude adjuster 162 may be coupled to a first hot electrode and not a second hot electrode so that the first hot electrode is driven by a drive signal that is amplitude and phase adjusted while the second hot electrode is driven by an unmodified drive signal.

Figure 15:
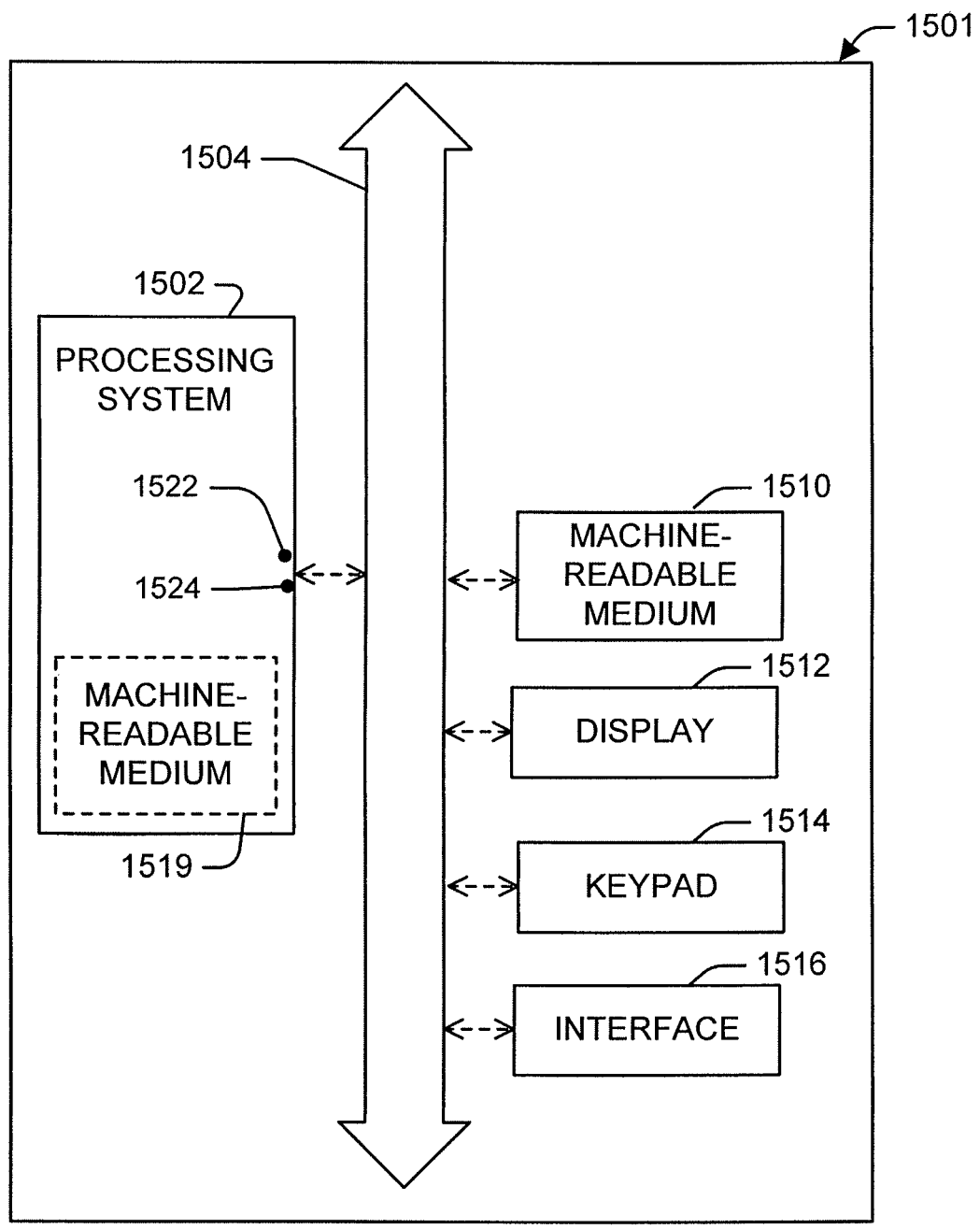
FIG. 15 is a conceptual block diagram illustrating an example of a processing system.

FIG. 15 is a conceptual block diagram illustrating an example of a system. A system 1501 may be, for example, a microcontroller 155 in FIG. 11D. The system 1501 includes a processing system 1502. The processing system 1502 is capable of communication with various components (e.g., 1510, 1512, 1514, 1516) through a bus 1504 or with other structures or devices. It should be understood that communication means other than busses can be utilized with the disclosed configurations.

The processing system 1502 may include a general-purpose processor or a specific-purpose processor for executing instructions and may further include a machine-readable medium 1519, such as a volatile or non-volatile memory, for storing data and/or instructions for software programs. The instructions, which may be stored in a machine-readable medium 1510 and/or 1519, may be executed by the processing system 1502 to control and manage access to the various networks, as well as provide other communication and processing functions. The instructions may also include instructions executed by the processing system 1502 for various user interface devices, such as a display 1512 and a keypad 1514. The processing system 1502 may include an input port 1522 and an output port 1524. Each of the input port 1522 and the output port 1524 may include one or more ports. The input port 1522 and the output port 1524 may be the same port (e.g., a bi-directional port) or may be different ports.

The processing system 1502 may be implemented using software, hardware, or a combination of both. By way of example, the processing system 1502 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1519) may include storage integrated into a processing system, such as might be the case with an ASIC. Machine-readable media (e.g., 1510) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1502. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a machine-readable storage medium or a computer-readable storage medium. Instructions can be, for example, a computer program including code.

An interface 1516 may be any type of interface and may reside between any of the components shown in FIG. 15. An interface 816 may also be, for example, an interface to one or more external devices (e.g., a DC bias supply 156, or an Internet network interface). An interface 1516 may be used to receive and/or transmit information. A functionality implemented in a processing system 1502 may be implemented in a portion of a machine-readable medium 1510, a portion of a display 1512, a portion of a keypad 1514, or a portion of an interface 1516, and vice versa Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology. For example, the orders of operations 1205 through 1245 may be rearranged. In another example, some of the specific connection of elements in the block diagrams may be rearranged, and some or all of the elements may be partitioned in a different way.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for" Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An optical modulator of the Mach-Zehnder type, comprising:
   a substrate comprising lithium niobate;
   a buffer layer disposed proximate the substrate;
   a first waveguide arm disposed proximate to the buffer layer, the first waveguide arm having a first width and a first length;
   a second waveguide arm disposed proximate to the buffer layer, the second waveguide arm having a second width and a second length;
   a first hot electrode disposed proximate to the first waveguide arm, the first hot electrode having a third width and a third length; and
   a second hot electrode disposed proximate to the second waveguide arm, the second hot electrode having a fourth width and a fourth length,
   wherein there is a difference in value between at least one of a pair of dimensions selected from the group of: the first and second widths, the first and second lengths, the third and fourth widths, and the third and fourth lengths,
   wherein the difference in value of the at least one pair of dimensions is selected to produce a chirp parameter of the optical modulator of at least a predetermined value, and
   wherein the first and second waveguide arms are under a differential drive and are configured to produce an output signal with a ratio of a third (3rd) order distortion term to fundamental given by:

$$\left[\left(\frac{a^3}{24}\right)\bigg/\left(a - \frac{a^3}{8}\right)\right] \cdot \left[\frac{1}{(1+\alpha^2/8)(1+\alpha^2/12)^4}\right]$$

where $$a = \frac{\pi(V_1 + V_2)}{V_\pi},$$

where $V_1$ represents an amplitude of an RF signal applied to the first hot electrode, where $V_2$ represents an amplitude of an RF signal applied to the second hot electrode in equal amplitude to $V_1$ but 180 degrees out of phase, where $V_\pi$ represents a bias voltage difference between a peak and a null of a transfer function curve associated with the optical modulator, and where $\alpha$ represents the chirp parameter of the optical modulator.

2. The optical modulator of claim 1, wherein an optical modulation apparatus comprises:
   a radio frequency (RF) signal source;
   a first amplifier coupled to the RF signal source;
   an RF signal adjuster coupled to the first amplifier;
   the optical modulator coupled to the RF signal adjuster;
   a bias controller coupled to the optical modulator;
   a photodetector coupled to the optical modulator;
   a second amplifier coupled to the photodetector; and
   a filter coupled to the second amplifier.

3. An optical modulation apparatus, comprising:
   an optical modulator of the Mach-Zehnder type comprising first and second waveguide arms formed within a substrate comprising lithium niobate and arranged in parallel, each of the first and second waveguide arms disposed to receive an optical input signal, the optical modulator further comprising first and second hot electrodes, each of the first and second hot electrodes disposed proximate to a respective one of the first and second waveguide arms, the optical modulator configured to modulate the optical input signals; and a radio frequency (RF) signal adjuster coupled to the first and second hot electrodes, the RF signal adjuster configured to provide first and second RF drive signals to the first and second hot electrodes respectively, wherein the first and second RF drive signals comprise at least one of an amplitude difference and a phase difference with respect to each other, and wherein the at least one difference is selected to produce a chirp parameter of the optical modulator of at least a predetermined value, and where the optical modulation apparatus is configured to produce an output signal with a ratio of a third (3rd) order distortion term to fundamental given by:

$$\left[\left(\frac{a^3}{24}\right) \Big/ \left(a - \frac{a^3}{8}\right)\right] \cdot \frac{(1 + \sin^6(\phi_0))\sin^6(\phi_0 + b/6)}{(1 + \sin^2(\phi_0))\sin^2(\phi_0 + b/2)}$$

where $$a = \frac{\pi(V_1 + V_2)}{V_\pi}, b = \frac{\pi(V_1 - V_2)}{V_\pi},$$

$\phi_0 = (\theta_1 - \theta_2)/2$, where $V_1$ represents an amplitude of the first RF drive signal, where $V_2$ represents an amplitude of the second RF drive signal, where $V_\pi$ represents a bias voltage difference between a peak and a null of a transfer function curve associated with the optical modulator, and $\theta_1 - \theta_2$ is a difference between a phase of the first RF drive signal and a phase of the second RF drive signal.

4. The optical modulation apparatus of claim 3, wherein a built-in chirp parameter of the optical modulator is zero.

5. The optical modulation apparatus of claim 3, wherein the first and second waveguide arms are physically symmetric, and the first and second hot electrodes are physically symmetric.

6. The optical modulation apparatus of claim 3, wherein at least one pair of the first and second waveguide arms and the first and second hot electrodes are physically asymmetric.

7. The optical modulation apparatus of claim 3, further comprising an RF signal source coupled to the RF signal adjuster.

8. The optical modulation apparatus of claim 3, wherein the RF signal source is an analog signal source.

9. The optical modulation apparatus of claim 3, further comprising an RF signal source coupled to the RF signal adjuster, wherein the RF signal source is a connection for an optical modulator.

10. The optical modulation apparatus of claim 3, wherein the RF signal adjuster comprises a phase adjuster configured to provide a phase adjusted signal to the first hot electrode.

11. The optical modulation apparatus of claim 3, wherein the RF signal adjuster comprises an amplitude adjuster configured to provide an amplitude adjusted signal to the second hot electrode.

12. The optical modulation apparatus of claim 3, wherein the RF signal adjuster comprises:
a signal splitter configured to receive an RF signal and provide a first RF signal and a second RF signal;
an amplitude adjuster coupled to the signal splitter and to the optical modulator; and
a phase adjuster coupled to the signal splitter and to the optical modulator.

13. The optical modulation apparatus of claim 3, wherein the first and second RF drive signals have different amplitudes and different phases, where a phase difference between the first and second RF drive signals is not 180*m degrees where m is one of zero, a positive integer or a negative integer.

* * * * *